United States Patent
Mohan et al.

(10) Patent No.: US 10,972,503 B1
(45) Date of Patent: Apr. 6, 2021

(54) DECEPTION MECHANISMS IN CONTAINERIZED ENVIRONMENTS

(71) Applicant: Acalvio Technologies, Inc., Santa Clara, CA (US)

(72) Inventors: Satish M. Mohan, San Jose, CA (US); Prashant Shantilal Chuahan, San Jose, CA (US)

(73) Assignee: ACALVIO TECHNOLOGIES, INC., Santa Clara, CA (US)

(*) Notice: Subject to any disclaimer, the term of this patent is extended or adjusted under 35 U.S.C. 154(b) by 97 days.

(21) Appl. No.: 16/536,217

(22) Filed: Aug. 8, 2019

Related U.S. Application Data

(60) Provisional application No. 62/716,315, filed on Aug. 8, 2018.

(51) Int. Cl.

| | |
|---|---|
| *H04L 29/06* | (2006.01) |
| *H04W 12/00* | (2021.01) |
| *H04L 12/12* | (2006.01) |
| *G06F 21/55* | (2013.01) |
| *H04W 12/12* | (2021.01) |

(52) U.S. Cl.
CPC .......... *H04L 63/1491* (2013.01); *H04L 63/14* (2013.01); *H04L 63/1441* (2013.01); *G06F 21/55* (2013.01); *H04W 12/00* (2013.01); *H04W 12/12* (2013.01); *H04W 12/1201* (2019.01)

(58) Field of Classification Search
CPC ..... H04L 29/06; H04L 63/14; H04L 63/1441; H04L 63/1491; G06F 21/55; H04W 12/00; H04W 12/12; H04W 12/1201
See application file for complete search history.

(56) References Cited

U.S. PATENT DOCUMENTS

| | | | |
|---|---|---|---|
| 10,333,951 B1 * | 6/2019 | Natanzon | H04L 63/1408 |
| 10,791,144 B1 * | 9/2020 | Golan | H04L 63/1425 |
| 2016/0080414 A1 * | 3/2016 | Kolton | H04L 63/1491 726/23 |
| 2017/0279854 A1 * | 9/2017 | Ramalingam | H04L 63/1491 |
| 2018/0103061 A1 * | 4/2018 | Allen | G06F 11/301 |
| 2018/0191779 A1 * | 7/2018 | Shieh | H04L 63/1425 |

* cited by examiner

*Primary Examiner* — Jayesh M Jhaveri
(74) *Attorney, Agent, or Firm* — Kilpatrick Townsend & Stockton LLP

(57) ABSTRACT

Provided are systems, methods, and computer-program products for deception mechanisms in a containerized environment. In various implementations, a deception platform can detect the configuration of a containerized environment, including namespaces, services, and configuration of the environment. The deception platform can determine appropriate decoy containerized services for the environment, and can deploy the decoy alongside production containerized service. The deception platform can further determine decoy breadcrumbs for luring attackers to the decoy containerized service. The decoy breadcrumbs can be injected into the environment at locations where an attacker will look for information for further infiltrating the environment. The deception platform can then monitor the decoy containerized service for unexpected accesses.

18 Claims, 23 Drawing Sheets

DECEPTION MECHANISMS IN CONTAINERIZED ENVIRONMENTS

CROSS REFERENCE TO RELATED APPLICATION

This application claims the benefit of priority under 35 U.S.C. § 119 of U.S. Provisional Application No. 62/716,315, filed on Aug. 8, 2018 and is incorporated herein by reference in its entirety.

BRIEF SUMMARY

Provided are systems, methods, and computer-program products for deception mechanisms in containerized environments. In various implementations, a deception platform can determine, deploy, and manage deceptions, in the form of decoy containers, in a containerized environment such as Kubernetes. The deception platform can further inject decoy data into the environment that can lead an attacker to the decoy containers. In these and other implementations, the decoy and decoy data can operate in concert to identify an infiltration into the containerized environment before an attacker has spent very much time in the environment.

An example system may include, for example, one or more data processors and a non-transitory computer-readable storage medium containing instructions. When executed on the one or more data processors, the instructions may cause the one or more processors to perform operations. The operations may include, for example, monitoring, by a monitoring service connected to a containerization system in a containerized environment, genuine services in the containerized environment to determine characteristics of the genuine services; determining one or more decoy services for the containerized environment, wherein the one or more decoy services are determined using the characteristics of the genuine services already existing in the containerized environment; deploying the decoy service in a decoy container in the containerized environment; injecting breadcrumb data into the containerized environment, wherein the breadcrumb data is a reference to the decoy service, and wherein injecting the breadcrumb data modifies the containerized environment to include the breadcrumb data; monitoring messages to the decoy service, wherein the messages include one or more requests received at the decoy service from a requestor; transmitting, from the decoy service, one or more responses to the one or more requests, wherein after the one or more responses are received by the decoy service, the one or more responses are transmitted to the requestor by the decoy service; and determining, using the messages, that the decoy service has been accessed and that the requestor is an intruder to the containerization system. Similar operations may be performed in an example method or an example or storage medium stored on a computer-program product, according to embodiments of the present technology.

In another aspect of the system, the decoy service forwards all requests from a requestor to a deception center located in the same or a different network. In another aspect of the system, the deception center generates a response to the request from the requestor, and transmits the response to the decoy service, wherein when the decoy service receives the response from the deception center, the decoy service transmits the response to the requestor. In another aspect of the system, when the decoy service is deployed in the decoy container in the containerized environment, the decoy service is registered with a service registry in the containerized environment. In another aspect of the system, the one or more decoy services include a stack of multiple, related decoy services. In another aspect of the system, the monitoring service is external to the containerization system. In another aspect of the system, the breadcrumb data includes information for discovering and accessing the decoy service.

BRIEF DESCRIPTION OF THE DRAWINGS

Illustrative embodiments are described in detail below with reference to the following figures.

DETAILED DESCRIPTION

Figure 1:
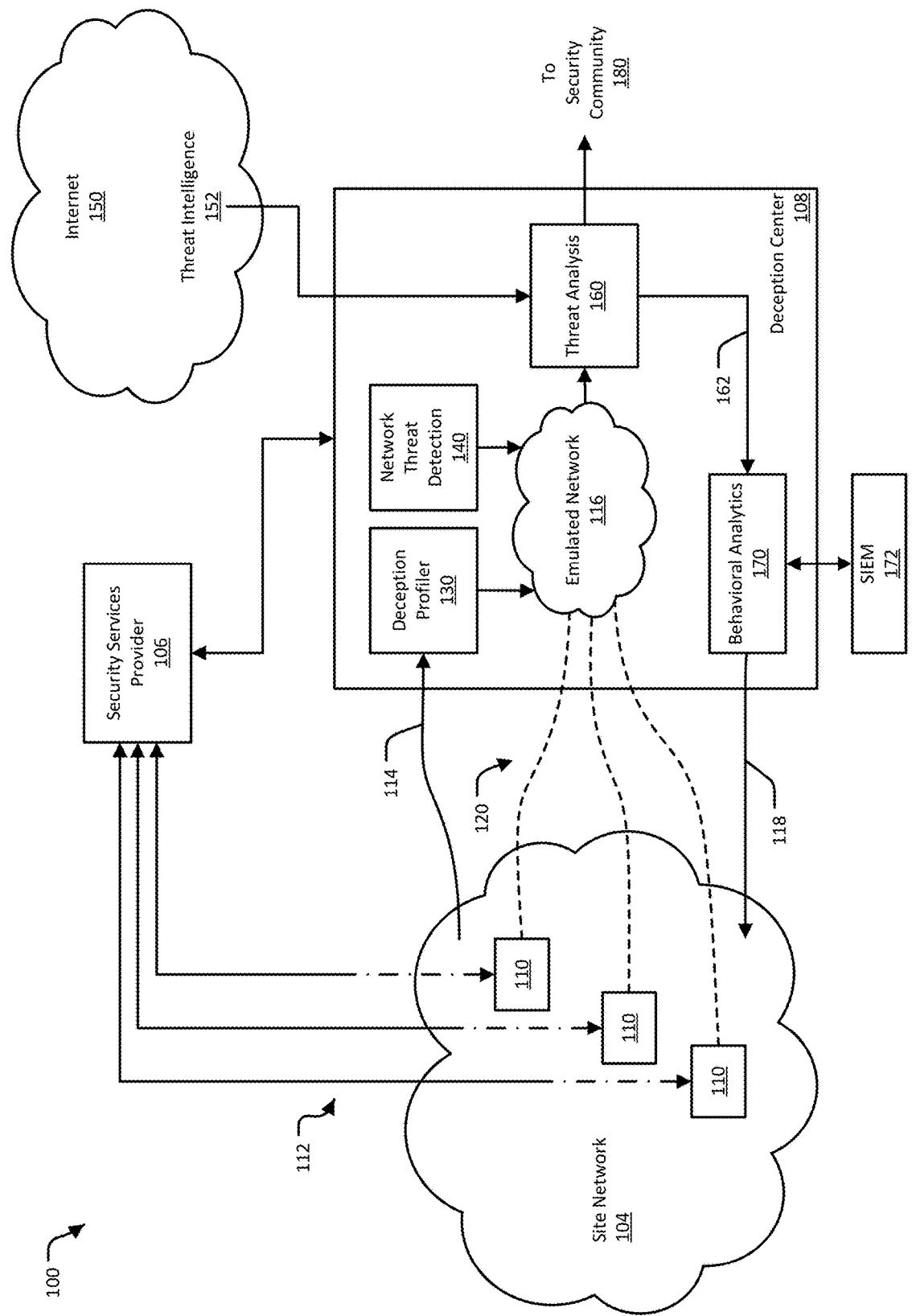
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting websites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deception mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where an attacker interacts or engages with systems in the network to steal information or do harm to the network. An attacker may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network. Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network attackers. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANS. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organizations network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the security services provider 106 is controlled by the same entity as that controls the site network 104.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 104 may include a deception profiler 130. In various implementations, the deception profiler 130 may derive information 114 from the site network 104, and determine, for example, the topology of the site network 104, the network devices included in the site network 104, the software and/or hardware configuration of each network device, and/or how the network is used at any given time. Using this information, the deception profile 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how an attacker infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators 162 that describe the suspect network activity, including indicating whether the suspect activity was or was not an actual threat. The threat analysis engine 160 may share these indicators 162 with the security community 180, so that other networks can be defended from the attack. The threat analysis engine 160 may also send the indicators 162 to the security services provider 106, so that the security services provider 106 can use the indicators 162 to defend other site networks.

In various implementations, the threat analysis engine 160 may also send threat indicators 162, or similar data, to a behavioral analytics engine 170. The behavioral analytics engine 170 may be configured to use the indicators 162 to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can work in conjunction with a Security Information and Event Management (SIEM) 172 system. In various implementations, SIEM includes software and/or services that can provide real-time analysis of security alerts generates by network hardware and applications. In various implementations, the deception center 108 can communicate with the SIEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, and attack to proceed, so that as much can be learned about the attack as possible. Information about the attack can then be used to find vulnerabilities in the site network 104. Information about the attack can also be provided to the security community 180, so that the attack can be thwarted elsewhere.

Figure 2:
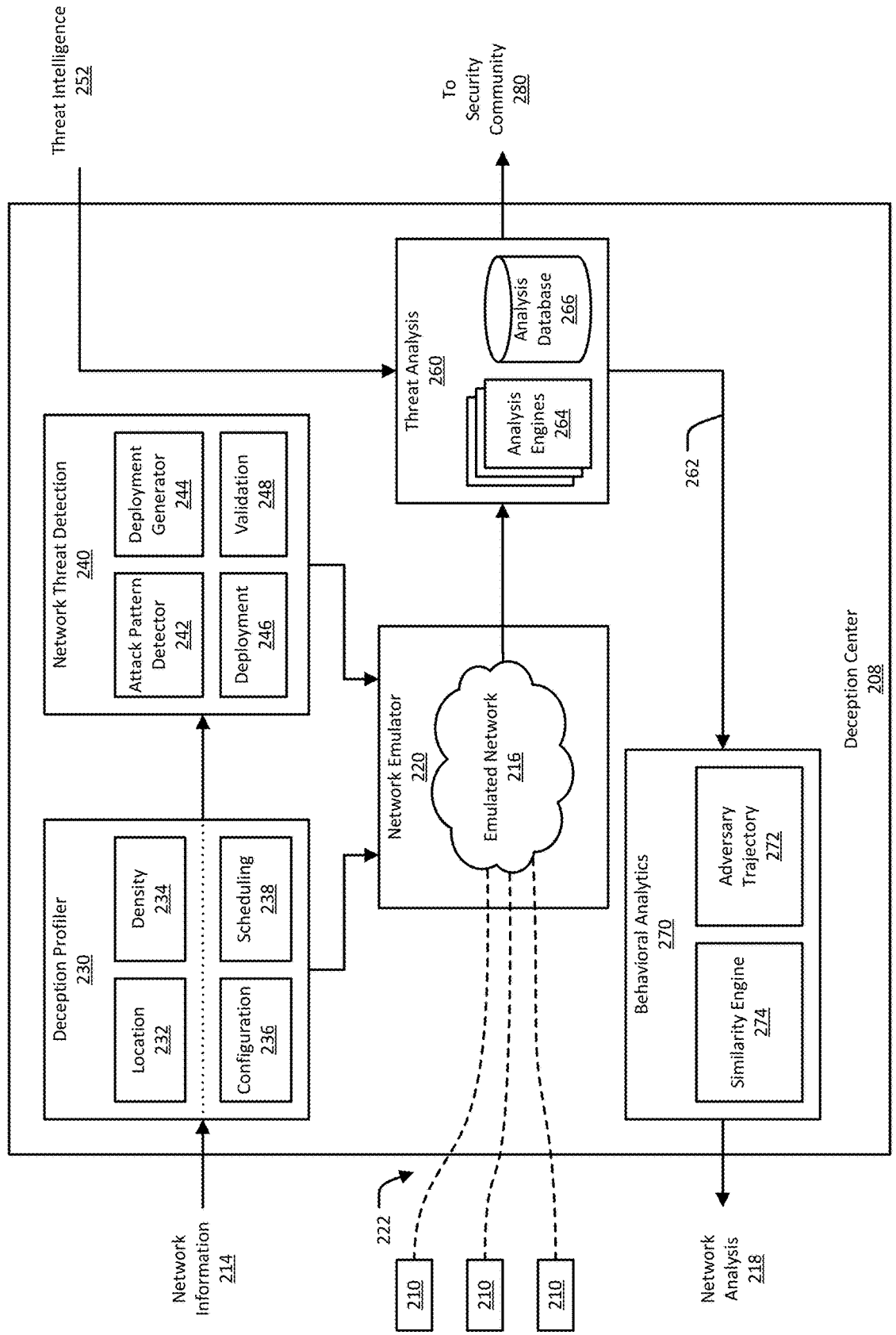
FIG. 2 illustrates an example of a deception center

As discussed above, a network threat and analysis system may include a deception center that is configured to provide network threat detection, analysis of network threats, and defense against network threats. FIG. 2 illustrates an example of a deception center 208. In this example, the deception center 208 includes at least five major components: a network emulator 220, a deception profiler 230, a network threat detection engine 240, a threat analysis engine 260, and a behavioral analytics engine 270. In various implementations, each of these components may be implemented using hardware, software, or a combination of hardware and software. In some implementations, one or more of the components may be combined. In some implementations, one or more of the components may be broken down into multiple components. In some implementations, the deception center 208 may be implemented as a single appliance. In some implementations, the deception center 208 may be implemented using a combination of computing systems. For example, one or more of the five example components may be implemented in a separate server. Alternatively or additionally, one or more of the components can be implemented as software processes. Alternatively or additionally, one or more of the components can be combined into one software process.

The network emulator 220 may be a system configured to host an emulated network 216. The emulated network 216 may include one or more emulated network devices. An emulated network device is a hardware and/or software component configured to mimic some or all of the behavior of a network device that may be found in a site network. For example, an emulated network device may include at least a distinct MAC address and IP address. The emulated network devices in the emulated network 216 may be used as deception mechanism in a site network. The emulated network devices may include, for example, address deception mechanisms, low-interaction deception mechanisms, and/or high-interaction deception mechanisms. In various implementations, the emulated network 216 may be quickly reconfigured. For example, new emulated network devices can be launched or existing emulated network devices can be removed. Alternatively or additionally, emulated network devices can be reconfigured. For example, an address deception can be escalated to a low-interaction deception, and/or a low-interaction deception can be escalated to a high-interaction deception. In some implementations, the emulated network 216 may be configured to act and respond as a fully functional network. In these implementations, the emulated network 216 may be referred to as a high-interaction network.

The emulated network 216 may be connected to one or more sensors 210 installed in the site network over network tunnels 222. The emulated network devices can be projected over the network tunnels 222 and through the sensors 210 into the site network, where they emulated network devices can function as deception mechanisms. The network emulator 220 is described in further detail below.

The deception profiler 230 may be configured to analyze the site network to determine which deception mechanisms to deploy into the site network, where to deploy them, and/or when to deploy them. The deception profiler 230 may receive network information 214 from the site network. This network information 214 may include information such as subnet addresses, IP addresses in use, an identity and/or configuration of devices in the site network, and/or profiles of usage patterns of the devices in the site network. Using this information, the deception profiler 230 may configure one or more deception mechanisms. For example, the deception profiler 230 may instruct the network emulator 220 to reconfigure the emulated network 216.

The deception profiler 230 in this example includes a location engine 232, a density engine 234, a configuration engine 236, and a scheduling engine 238. The location engine 232 may determine where in the site network to deploy deception mechanisms. The density engine 234 may determine how many deception mechanisms to deploy. The configuration engine 236 may determine how each deception mechanism is to be configured, and may provide configurations to the network emulator 220. The scheduling engine 238 may determine when a deception mechanism should be deployed and/or activated. The components of the deception profiler 230 are described in further detail below.

The network threat detection engine 240 may be configured to monitor the site network and watch for possible attacks. For example, the network threat detection engine

240 may detect an access to a deception mechanism. The network threat detection engine 240 may further attempt to confirm that suspicious activity in the site network is an actual attack. To do so, in various implementations, the network threat detection engine 240 may instruct the network emulator 220 to reconfigure the emulated network 216 to create deceptions that are more attractive to an attacker and/or to contain the possible attacker to the emulated network 216.

In this example, the network threat detection engine 240 includes an attack pattern detector 242, a deployment generator 244, a deployment engine 246, and a validation engine 248. The attack pattern detector 242 may receive network information 214 from various network devices in the site network, and analyze the network information 214 to determine whether a network abnormality has occurred or is occurring. The deployment generator 244 may analyze suspected attack patterns from the attack pattern detector 242 to determine what should be done to confirm that an attack has occurred or is in progress. The deployment engine 246 may implement a deployment strategy generated by the deployment generator 244. The deployment strategy may include instructing the network emulator 220 to add, remove, and/or modify emulated network devices in the emulated network 216, and/or to modify the deception mechanisms projected into the site network. The validation engine 248 may analyze the deployment strategy and feedback data received from the site network and/or the emulated network 216 to confirm whether an attack has occurred. The network threat detection engine 240 is described in further detail below.

The threat analysis engine 260 may receive data collected from the emulated network during the course of an incident that has been allowed to proceed within the emulated network 216. Generally, when a suspected threat to the site network has been detected, the components of the deception center 208 may redirect and contain suspect network traffic related to the attack to the emulated network 216. Once contained to the emulated network 216, the suspected attacked may be allowed to proceed. By allowing the suspected attack to proceed, information can be learned about the suspected attack, such as the manner of the attack, the motivation for the attack, network vulnerabilities that allow the attack to proceed, and so on. As the attack is allowed to proceed, information is collected by the emulated network 216, such as log files, memory snapshots, packets, and any other information that may be generated by suspect network traffic and interacting with suspect network traffic.

In various implementations, the threat analysis engine 260 may include one or more analysis engines 264 for analyzing different types of data collected in the network emulator. To analyze the data, in some implementations the threat analysis engine 260 may receive threat intelligence 252 from, for example, the network security community. The threat intelligence 252 may include, for example, descriptions of current (e.g. for a given day or hour or minute) known network threats. The threat analysis engine 260 may also include an analysis database 266 for storing data collected in the emulated network 216 and/or analysis results from the analysis engines 264.

In various implementations, the threat analysis engine 260 may produce indicators 262 that describe a particular incident that was analyzed using the emulated network 216. These indicators 262 may include, for example, digital signatures of malicious files, IP addresses of malicious sites, and/or descriptions of the course of events in the incident. In some implementations, the indicators may be provided to the network security community 280. The indicators 262 may also be provided to the behavioral analytics engine 270. The threat analysis engine 260 is described in further detail below.

The behavioral analytics engine 270 includes two engines that may be used to analyze a site network for an attack or suspected attack: an adversary trajectory engine 272 and a similarity engine 274.

The adversary trajectory engine 272 may analyze the various ways in which an attack may have occurred in a site network. Using this information, and possibly also the indicators 262, the adversary trajectory engine 272 may trace the possible path of a specific incident in the site network. This path may point to network devices in the site network that could have been affected by the incident. These network devices can be checked to determine whether they have, in fact, been affected.

The similarity engine 274 may use the indicators 262 to identify similar machines. For example, given emulated network devices in the emulated network 216, the similarity engine 274 may determine query items from, for example, the indicators 262, and use the query items to identify similar network devices in the site network. Alternatively or additionally, the similarity engine 274 may receive query items generated from network devices in the site network, and may use those query items to find similar network devices in the site network.

The adversary trajectory engine 272 and the similarity engine 274 are each described in further detail below.

Using the adversary trajectory engine 272 and/or the similarity engine 274, the behavioral analytics engine 270 may produce a network analysis 218. The network analysis 218 may indicate, for example, whether the site network has been exposed to a particular attack, which (if any) network devices may have been affected by the attack, how the network devices were affected by the attack, and/or how the site network's security can be improved. The network analysis 218 can be used to scrub the effects of an attack from the site network, and/or to increase the security of the site network.

The network security system, such as the deception-based system described above, may be flexibly implemented to accommodate different customer networks. FIGS. 3A-3D provide examples of different installation configurations 300a-300d that can be used for different customer networks 302. A customer network 302 may generally be described as a network or group of networks that is controlled by a common entity, such as a business, a school, or a person. The customer network 302 may include one or more site networks 304. The customer network's 302 site networks 304 may be located in one geographic location, may be behind a common firewall, and/or may be multiple subnets within one network. Alternatively or additionally, a customer network's 302 site networks 304 may be located in different geographic locations, and be connected to each other over various private and public networks, including the Internet 350.

Different customer networks 302 may have different requirements regarding network security. For example, some customer networks 302 may have relatively open connections to outside networks such as the Internet 350, while other customer networks 302 have very restricted access to outside networks. The network security system described in FIG. 1 may be configurable to accommodate these variations.

Figure 3A:
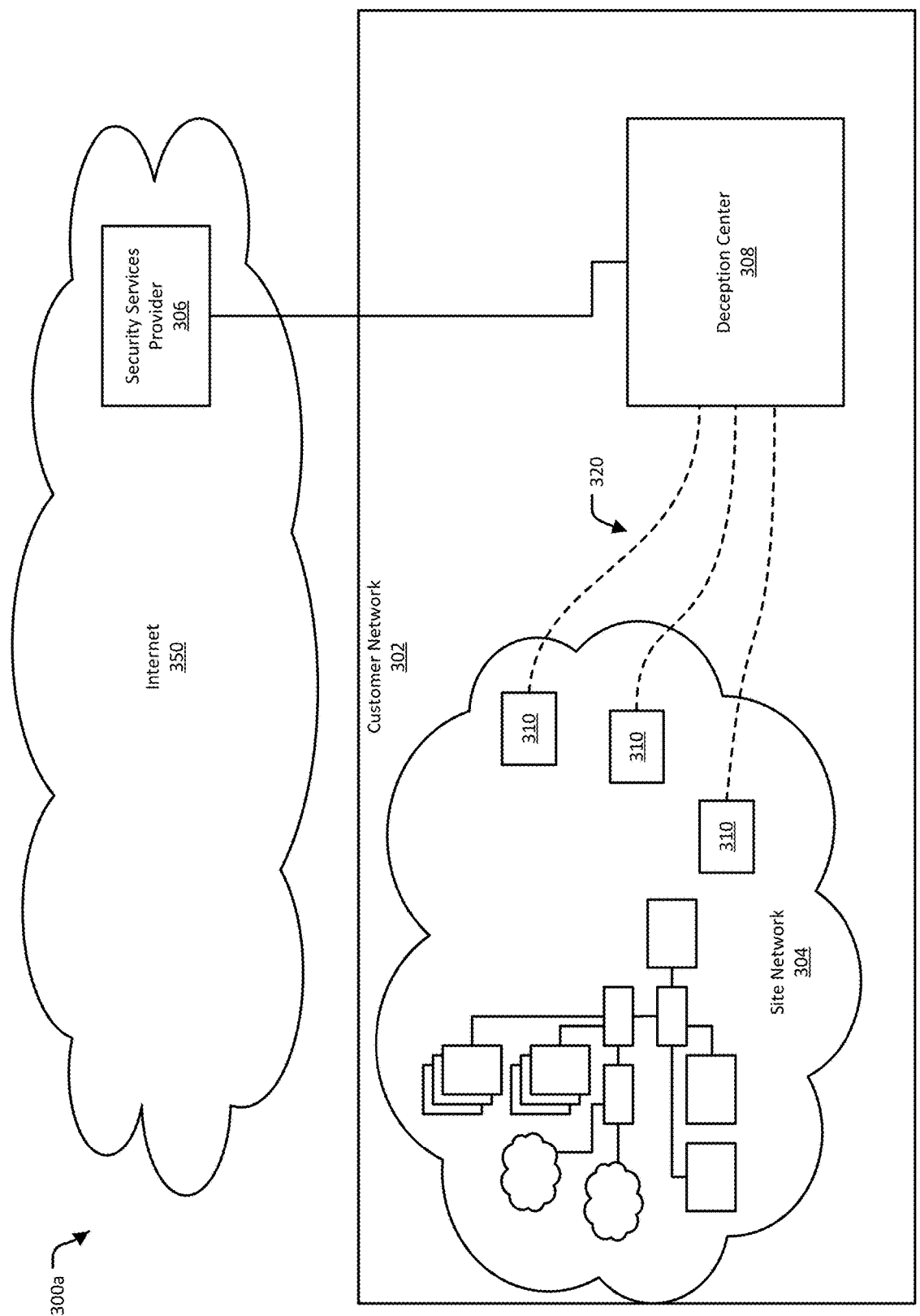
FIGS. 3A-3D provide examples of different installation configurations that can be used for different customer networks.

FIG. 3A illustrates one example of an installation configuration 300a, where a deception center 308 is located within the customer network 302. In this example, being located within the customer network 302 means that the deception center 308 is connected to the customer network 302, and is able to function as a node in the customer network 302. In this example, the deception center 308 may be located in the same building or within the same campus as the site network 304. Alternatively or additionally, the deception center 308 may be located within the customer network 302 but at a different geographic location than the site network 304. The deception center 308 thus may be within the same subnet as the site network 304, or may be connected to a different subnet within the customer network.

In various implementations, the deception center 308 communicates with sensors 310, which may also be referred to as deception sensors, installed in the site network over network tunnels 320 In this example, the network tunnels 320 may cross one or more intermediate within the customer network 302.

In this example, the deception center 308 is able to communicate with a security services provider 306 that is located outside the customer network 302, such as on the Internet 350. The security services provider 306 may provide configuration and other information for the deception center 308. In some cases, the security services provider 306 may also assist in coordinating the security for the customer network 302 when the customer network 302 includes multiple site networks 304 located in various geographic areas.

Figure 3B:
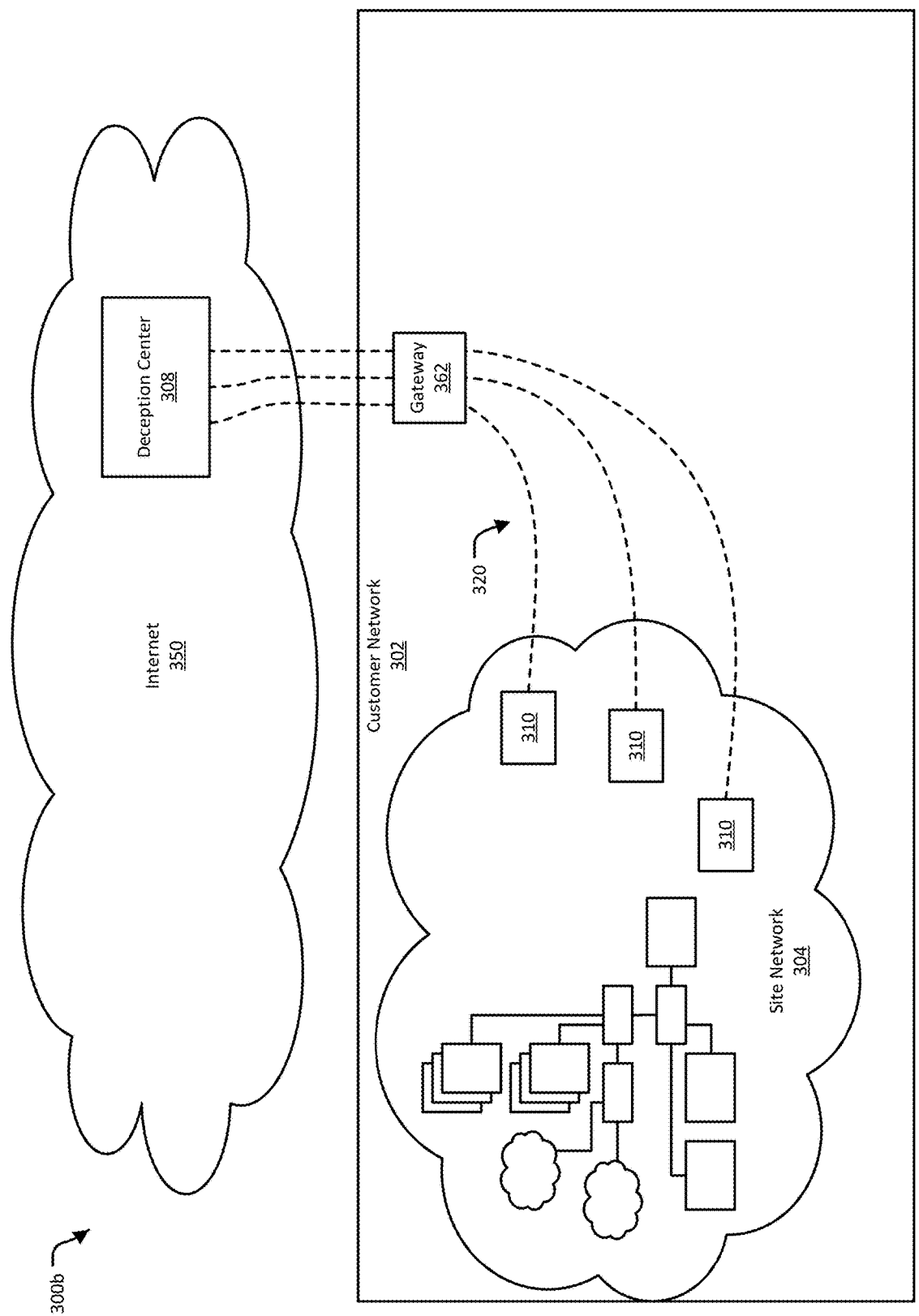

FIG. 3B illustrates another example of an installation configuration 300b, where the deception center 308 is located outside the customer network 302. In this example, the deception center 308 may connected to the customer network 302 over the Internet 350. In some implementations, the deception center 308 may be co-located with a security services provider, and/or may be provided by the security services provider.

In this example, the tunnels 320 connect the deception center 308 to the sensors 310 through a gateway 362. A gateway is a point in a network that connects the network to another network. For example, in this example, the gateway 362 connects the customer network 302 to outside networks, such as the Internet 350. The gateway 362 may provide a firewall, which may provide some security for the customer network 302. The tunnels 320 may be able to pass through the firewall using a secure protocol, such as Secure Socket Shell (SSH) and similar protocols. Secure protocols typically require credentials, which may be provided by the operator of the customer network 302.

Figure 3C:
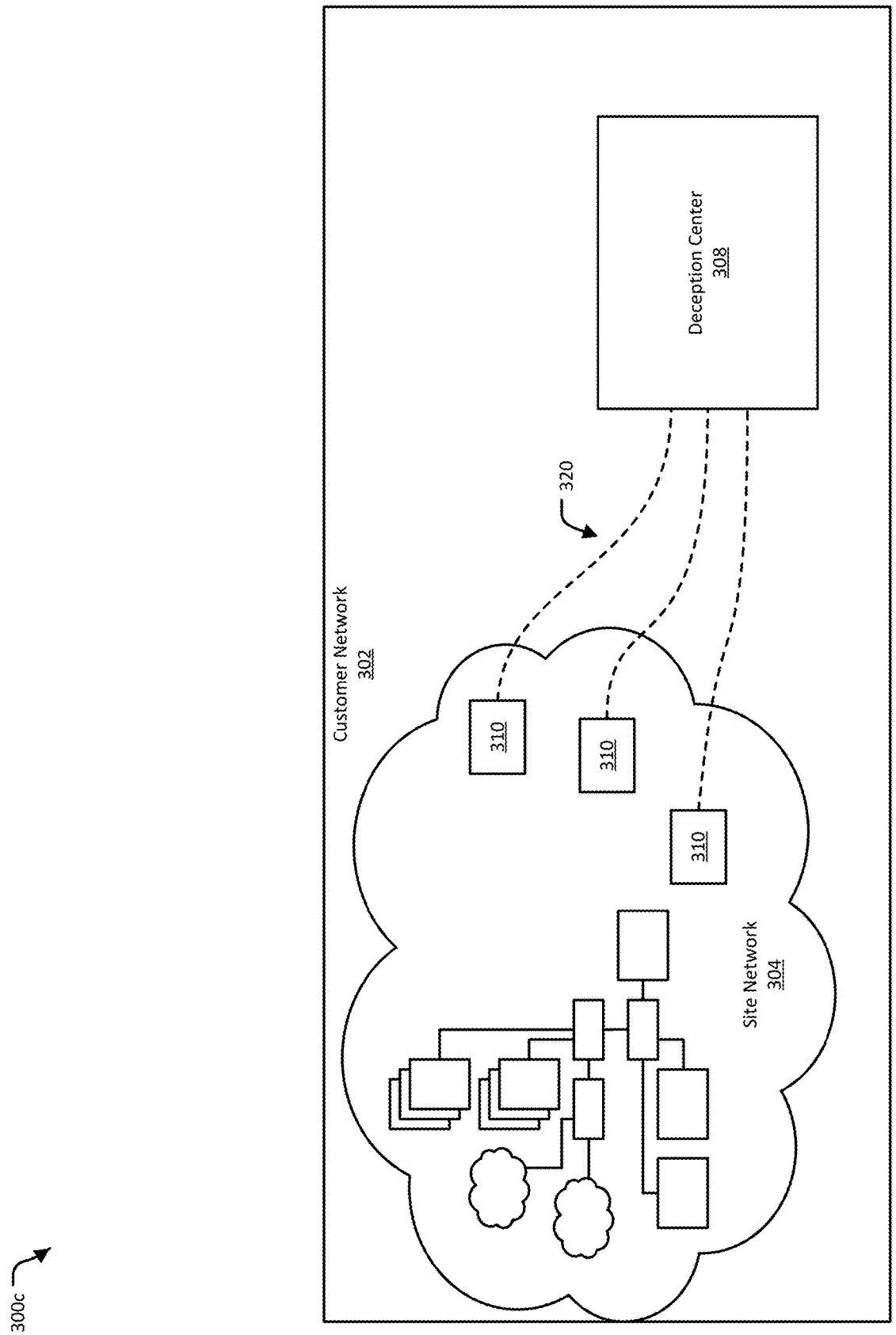

FIG. 3C illustrates another example of an installation configuration 300c, where the deception center 308 is located inside the customer network 302 but does not have access to outside networks. In some implementations, the customer network 302 may require a high level of network security. In these implementations, the customer network's 302 connections to the other networks may be very restricted. Thus, in this example, the deception center 308 is located within the customer network 302, and does not need to communicate with outside networks. The deception center 308 may use the customer networks 302 internal network to coordinate with and establish tunnels 320 to the sensors 310. Alternatively or additionally, a network administrator may configure the deception center 308 and sensors 310 to enable them to establish the tunnels. 320.

Figure 3D:
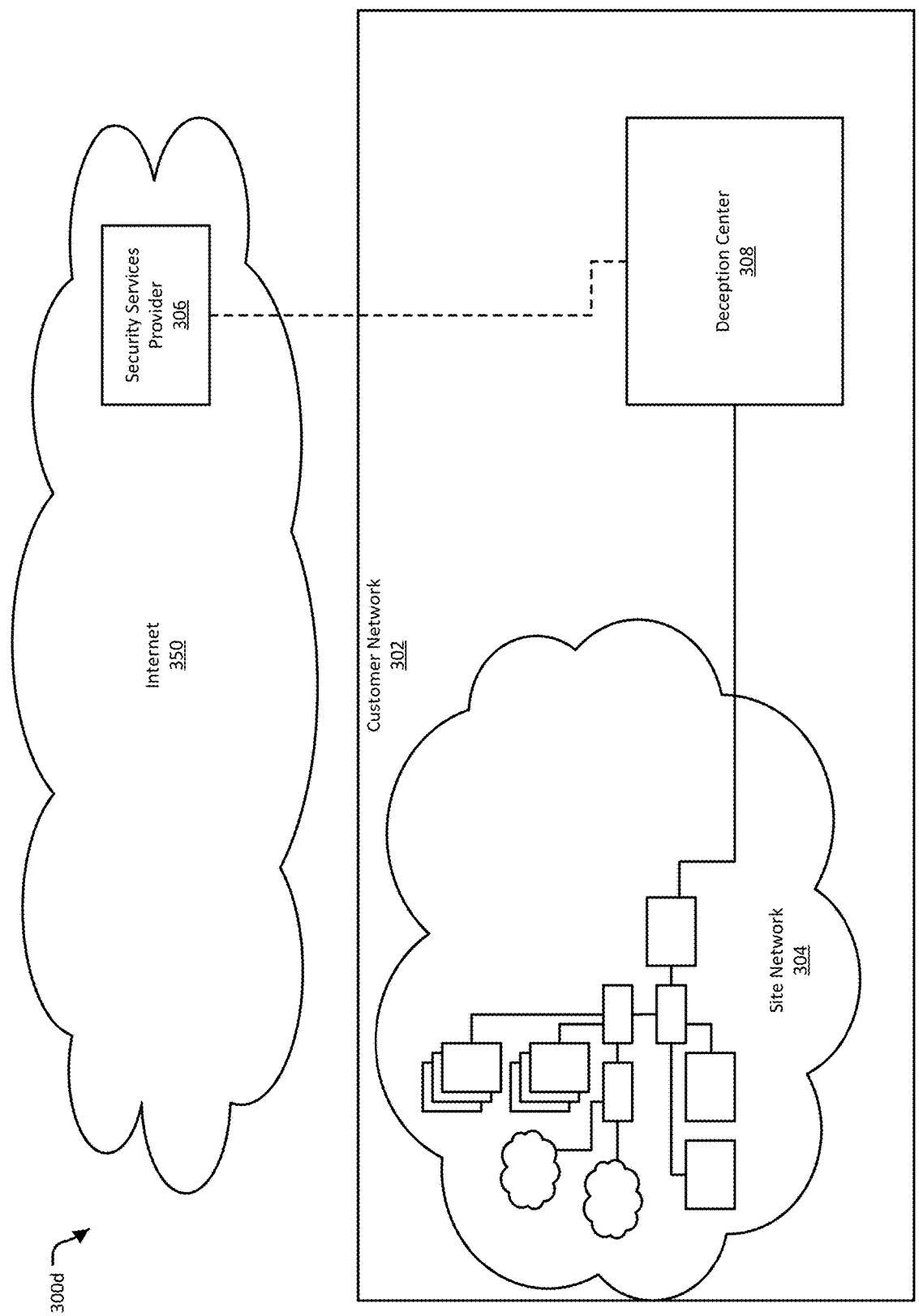

FIG. 3D illustrates another example of an installation configuration 300d, where the deception center 308 is located inside the customer network 302 but has access to outside networks. In these implementations, the customer network's 302 connections to the other networks may be via a security service provider 306. Thus, in this example, the deception center 308 is located within the customer network 302, and communicates with outside networks.

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 4A:
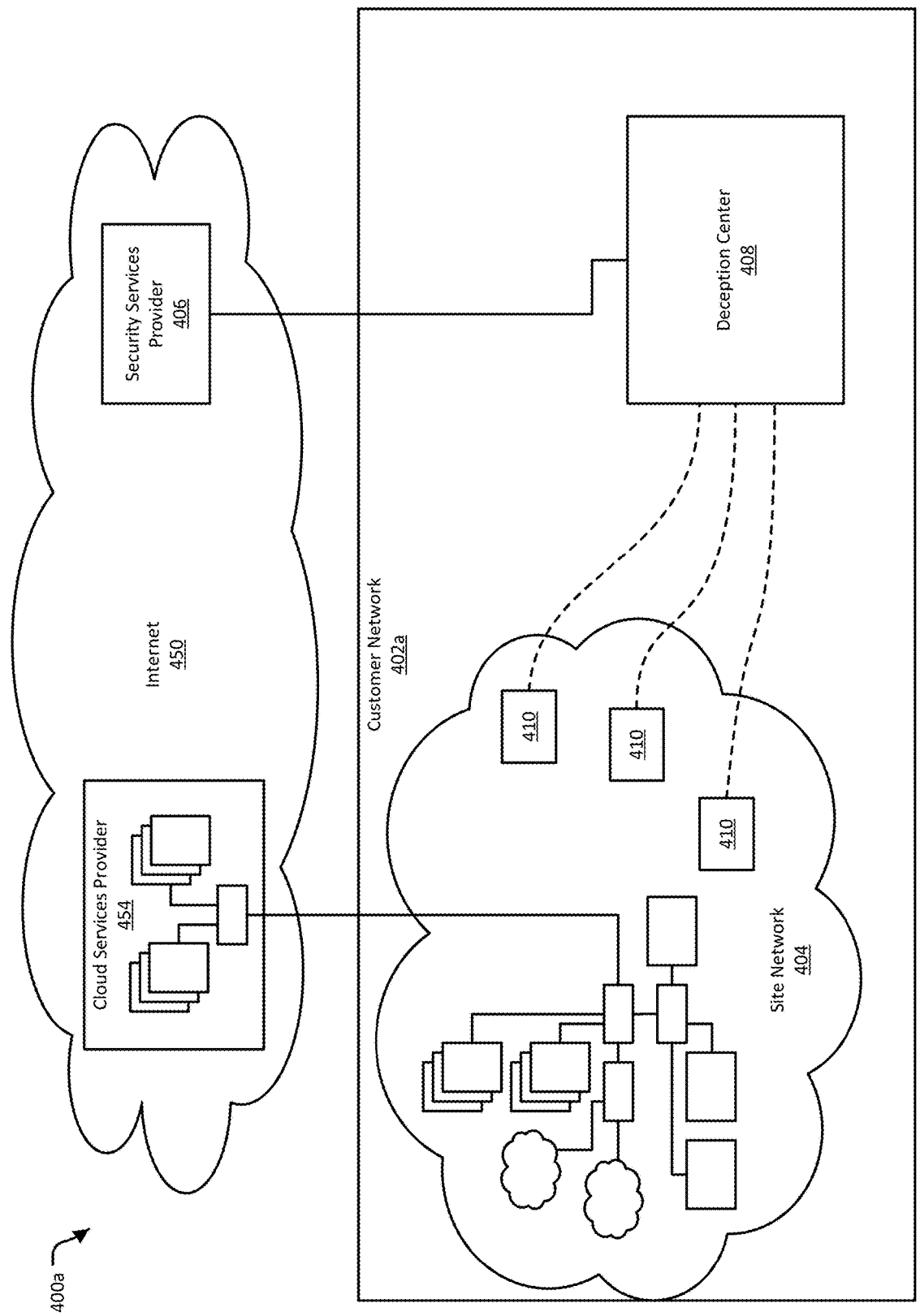
FIGS. 4A-4B illustrate examples of customer networks where some of the customer networks' network infrastructure is "in the cloud," that is, is provided by a cloud services provider.
Figure 4B:
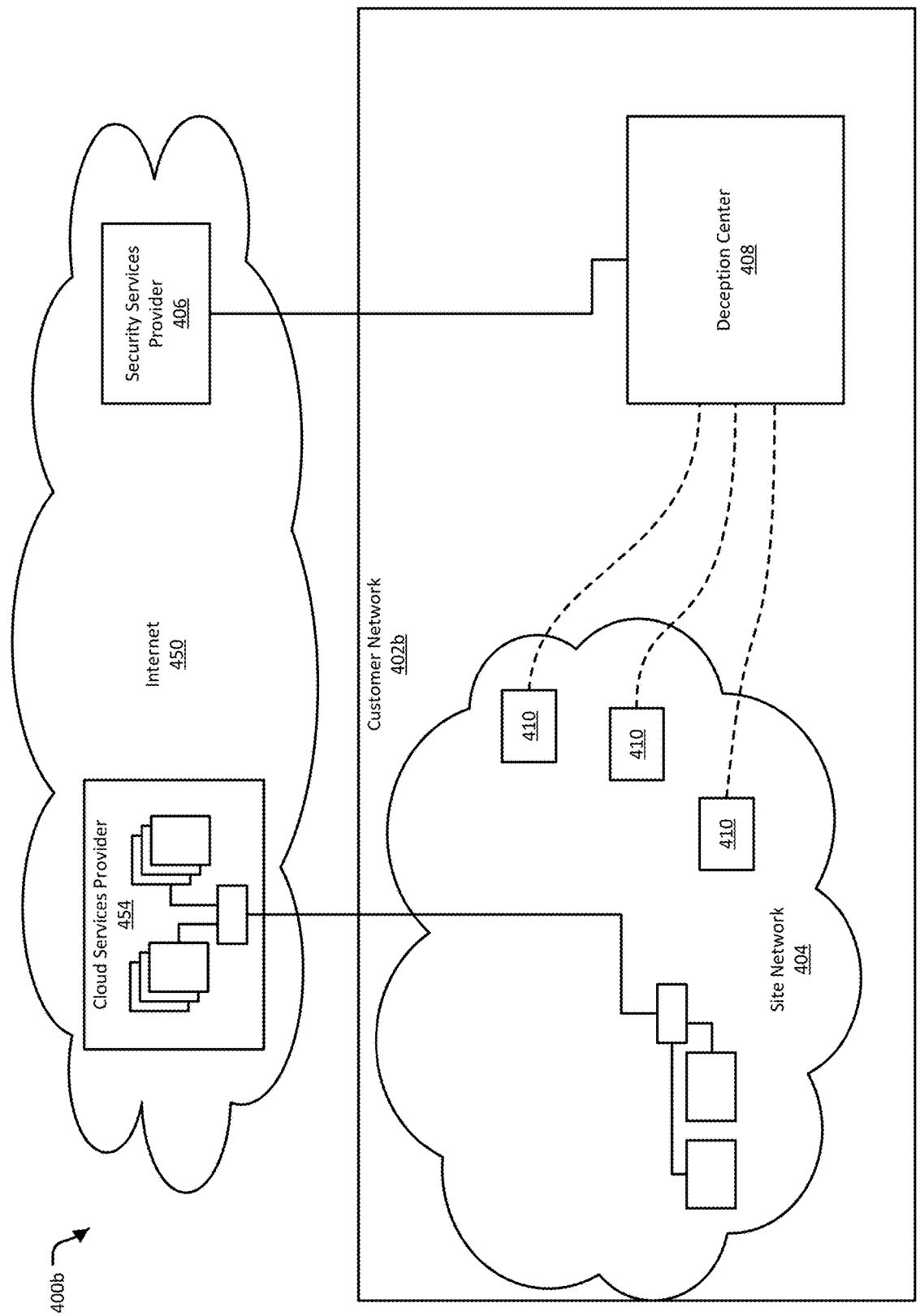

FIGS. 4A-4B illustrate examples of customer networks 402a-402b where some of the customer networks' 402a-402b network infrastructure is "in the cloud," that is, is provided by a cloud services provider 454. These example customer networks 402a-402b may be defended by a network security system that includes a deception center 408 and sensors 410, which may also be referred to as deception sensors, and may also include an off-site security services provider 406.

A cloud services provider is a company that offers some component of cloud computer—such as Infrastructure as a Service (IaaS), Software as a Service (SaaS) or Platform as Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 4A-4B, the customer networks' 402a-402b network is partially in a site network 404, and partially provided by the cloud services provider 454. In some cases, the site network 404 is the part of the customer networks 402a-402b that is located at a physical site owned or controlled by the customer network 402a-402b. For example, the site network 404 may be a network located in the customer network's 402a-402b office or campus. Alternatively or additionally, the site network 404 may include network equipment owned and/or operated by the customer network 402a-402b that may be located anywhere. For example, the customer networks' 402a-402b operations may consist of a few laptops owned by the customer networks 402a-402b, which are used from the private homes of the lap tops' users, from a co-working space, from a coffee shop, or from some other mobile location.

In various implementations, sensors 410 may be installed in the site network 404. The sensors 410 can be used by the network security system to project deceptions into the site network 404, monitor the site network 404 for attacks, and/or to divert suspect attacks into the deception center 408.

In some implementations, the sensors 410 may also be able to project deceptions into the part of the customer networks 402a-402b network that is provided by the cloud services provider 454. In most cases, it may not be possible to install sensors 410 inside the network of the cloud services provider 454, but in some implementations, this may not be necessary. For example, as discussed further below, the deception center 408 can acquire the subnet address of the network provided by the cloud services provider 454, and use that subnet address the create deceptions. Though these deceptions are projected form the sensors 410 installed in the site network 404, the deceptions may appear to be within the subnet provided by the cloud service provider 454.

In illustrated examples, the deception center 408 is installed inside the customer networks 402a-402b. Though not illustrated here, the deception center 408 can also be installed outside the customer networks 402a-402b, such as for example somewhere on the Internet 450. In some implementations, the deception center 408 may reside at the same location as the security service provider 406. When located outside the customer networks 402a-402b, the deception center 408 may connect to the sensors 410 in the site network 404 over various public and/or private networks.

FIG. 4A illustrates an example of a configuration 400a where the customer network's 402a network infrastructure is located in the cloud and the customer network 402a also has a substantial site network 404. In this example, the customer may have an office where the site network 404 is located, and where the customer's employees access and use the customer network 402a. For example, developers, sales and marketing personnel, human resources and finance employees, may access the customer network 402a from the site network 404. In the illustrated example, the customer may obtain applications and services from the cloud services provider 454. Alternatively or additionally, the cloud services provider 454 may provide data center services for the customer. For example, the cloud services provider 454 may host the customer's repository of data (e.g., music provided by a streaming music service, or video provided by a streaming video provider). In this example, the customer's own customers may be provided data directly from the cloud services provider 454, rather than from the customer network 402a.

FIG. 4B illustrates and example of a configuration 400b where the customer network's 402b network is primarily or sometimes entirely in the cloud. In this example, the customer network's 402b site network 404 may include a few laptops, or one or two desktop servers. These computing devices may be used by the customer's employees to conduct the customer's business, while the cloud service provider 454 provides the majority of the network infrastructure needed by the customer. For example, a very small company may have no office space and no dedicated location, and have as computing resources only the laptops used by its employees. This small company may use the cloud services provider 454 to provide its fixed network infrastructure. The small company may access this network infrastructure by connecting a laptop to any available network connection (e.g., in a co-working space, library, or coffee shop). When no laptops are connected to the cloud services provider 454, the customer network 402b may be existing entirely within the cloud.

In the example provided above, the site network 404 can be found wherever the customer's employees connect to a network and can access the cloud services provider 454. Similarly, the sensors 410 can be co-located with the employees' laptops. For example, whenever an employee connects to a network, she can enable a sensor 410, which can then project deceptions into the network around her. Alternatively or additionally, sensors 410 can be installed in a fixed location (such as the home of an employee of the customer) from which they can access the cloud services provider 454 and project deceptions into the network provided by the cloud services provider 454.

Figure 5:
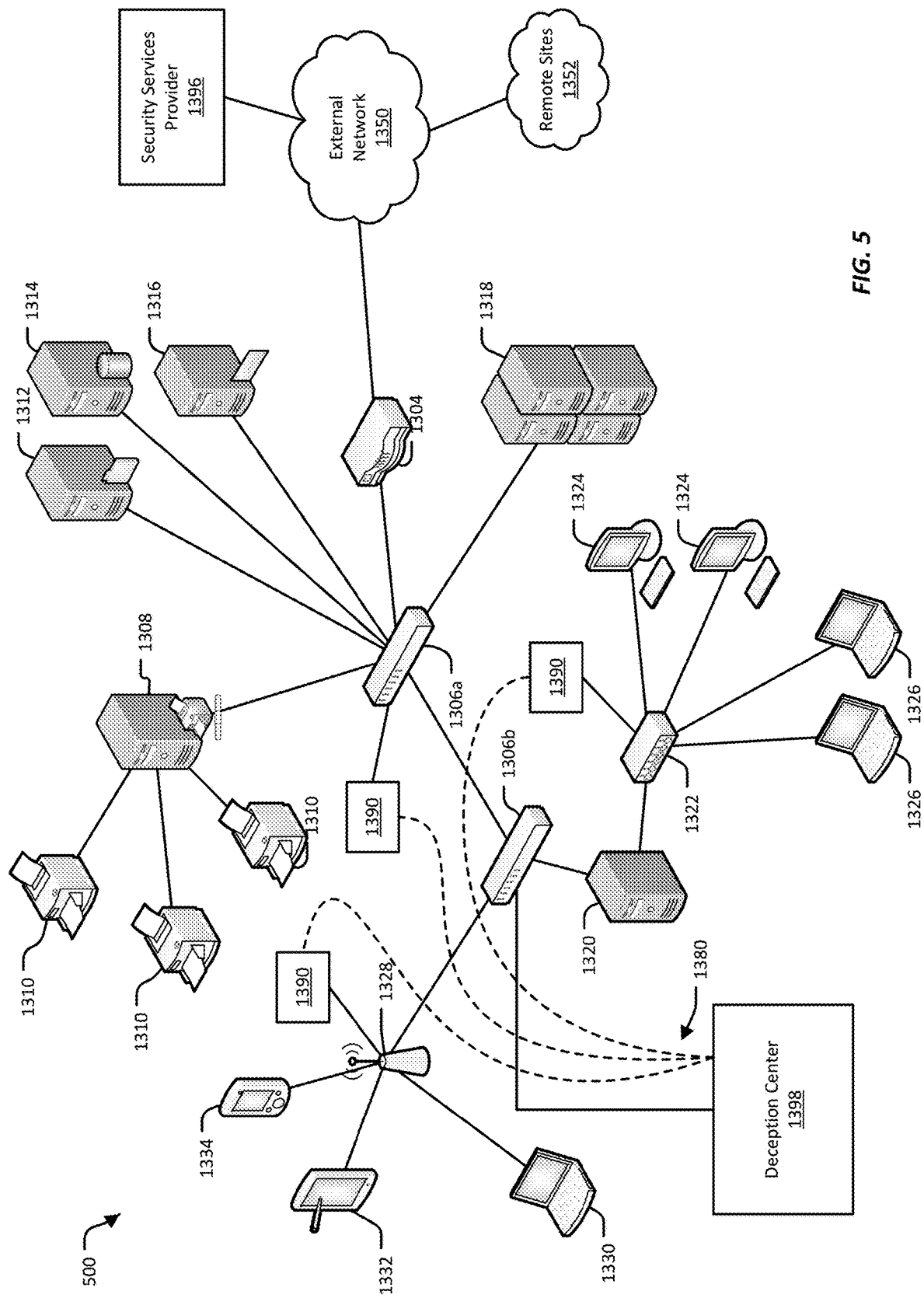
FIG. 5 illustrates an example of an enterprise network.

The network security system, such as the deception-based system discussed above, can provide network security for a variety of customer networks, which may include a diverse array of devices. FIG. 5 illustrates an example of an enterprise network 500, which is one such network that can be defended by a network security system. The example enterprise network 500 illustrates examples of various network devices and network clients that may be included in an enterprise network. The enterprise network 500 may include more or fewer network devices and/or network clients, and/or may include network devices, additional networks including remote sites 552, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 500 may also be found at small sites, such as in a small business.

The enterprise network 500 may be connected to an external network 550. The external network 550 may be a public network, such as the Internet. A public network is a network that has been made accessible to any device that can connect to it. A public network may have unrestricted access, meaning that, for example, no password or other authentication is required to connect to it. The external network 550 may include third-party telecommunication lines, such as phone lines, broadcast coaxial cable, fiber optic cables, satellite communications, cellular communications, and the like. The external network 550 may include any number of intermediate network devices, such as switches, routers, gateways, servers, and/or controllers that are not directly part of the enterprise network 500 but that facilitate communication between the network 500 and other network-connected entities, such as a remote site 552.

Remote sites 552 are networks and/or individual computers that are generally located outside the enterprise network 500, and which may be connected to the enterprise 500 through intermediate networks, but that function as if within the enterprise network 500 and connected directly to it. For example, an employee may connect to the enterprise network 500 while at home, using various secure protocols, and/or by connecting to a Virtual Private Network (VPN) provided by the enterprise network 500. While the employee's computer is connected, the employee's home is a remote site 552. Alternatively or additionally, the enterprise network's 500 owner may have a satellite office with a small internal network. This satellite office's network may have a fixed connection to the enterprise network 500 over various intermediate networks. This satellite office can also be considered a remote site.

The enterprise network 500 may be connected to the external network 550 using a gateway device 504. The gateway device 504 may include a firewall or similar system for preventing unauthorized access while allowing authorized access to the enterprise network 500. Examples of gateway devices include routers, modems (e.g. cable, fiber optic, dial-up, etc.), and the like.

The gateway device 504 may be connected to a switch 506a. The switch 506a provides connectivity between various devices in the enterprise network 500. In this example, the switch 506a connects together the gateway device 504, various servers 508, 512, 514, 516, 518, an another switch 506*b*. A switch typically has multiple ports, and functions to direct packets received on one port to another port. In some implementations, the gateway device 504 and the switch 506*a* may be combined into a single device.

Various servers may be connected to the switch 506*a*. For example, a print server 508 may be connected to the switch 506*a*. The print server 508 may provide network access to a number of printers 510. Client devices connected to the enterprise network 500 may be able to access one of the printers 510 through the printer server 508.

Other examples of servers connected to the switch 506*a* include a file server 512, database server 514, and email server 516. The file server 512 may provide storage for and access to data. This data may be accessible to client devices connected to the enterprise network 500. The database server 514 may store one or more databases, and provide services for accessing the databases. The email server 516 may host an email program or service, and may also store email for users on the enterprise network 500.

As yet another example, a server rack 518 may be connected to the switch 506*a*. The server rack 518 may house one or more rack-mounted servers. The server rack 518 may have one connection to the switch 506*a*, or may have multiple connections to the switch 506*a*. The servers in the server rack 518 may have various purposes, including providing computing resources, file storage, database storage and access, and email, among others.

An additional switch 506*b* may also be connected to the first switch 506*a*. The additional switch 506*b* may be provided to expand the capacity of the network. A switch typically has a limited number of ports (e.g., 8, 16, 32, 64 or more ports). In most cases, however, a switch can direct traffic to and from another switch, so that by connecting the additional switch 506*b* to the first switch 506*a*, the number of available ports can be expanded.

In this example, a server 520 is connected to the additional switch 506*b*. The server 520 may manage network access for a number of network devices or client devices. For example, the server 520 may provide network authentication, arbitration, prioritization, load balancing, and other management services as needed to manage multiple network devices accessing the enterprise network 500. The server 520 may be connected to a hub 522. The hub 522 may include multiple ports, each of which may provide a wired connection for a network or client device. A hub is typically a simpler device than a switch, and may be used when connecting a small number of network devices together. In some cases, a switch can be substituted for the hub 522. In this example, the hub 522 connects desktop computers 524 and laptop computers 526 to the enterprise network 500. In this example, each of the desktop computers 524 and laptop computers 526 are connected to the hub 522 using a physical cable.

In this example, the additional switch 506*b* is also connected to a wireless access point 528. The wireless access point 528 provides wireless access to the enterprise network 500 for wireless-enabled network or client devices. Examples of wireless-enabled network and client devices include laptops 530, tablet computers 532, and smart phones 534, among others. In some implementations, the wireless access point 528 may also provide switching and/or routing functionality.

The example enterprise network 500 of FIG. 5 is defended from network threats by a network threat detection and analysis system, which uses deception security mechanisms to attract and divert attacks on the network. The deceptive security mechanisms may be controlled by and inserted into the enterprise network 500 using a deception center 598 and sensors 590, which may also be referred to as deception sensors, installed in various places in the enterprise network 500. In some implementations, the deception center 598 and the sensors 590 interact with a security services provider 596 located outside of the enterprise network 500. The deception center 598 may also obtain or exchange data with sources located on external networks 550, such as the Internet.

In various implementations, the sensors 590 are a minimal combination of hardware and/or software, sufficient to form a network connection with the enterprise network 500 and a network tunnel 580 with the deception center 598. For example, a sensor 590 may be constructed using a low-power processor, a network interface, and a simple operating system. In some implementations, any of the devices in the enterprise network (e.g., the servers 508, 512, 516, 518 the printers 510, the computing devices 524, 526, 530, 532, 534, or the network infrastructure devices 504, 506*a*, 506*b*, 528) can be configured to act as a sensor.

In various implementations, one or more sensors 590 can be installed anywhere in the enterprise network 500, include being attached switches 506*a*, hubs 522, wireless access points 528, and so on. The sensors 590 can further be configured to be part of one or more VLANs. The sensors 590 provide the deception center 598 with visibility into the enterprise network 500, such as for example being able to operate as a node in the enterprise network 500, and/or being able to present or project deceptive security mechanisms into the enterprise network 500. Additionally, in various implementations, the sensors 590 may provide a portal through which a suspected attack on the enterprise network 500 can be redirected to the deception center 598.

The deception center 598 provides network security for the enterprise network 500 by deploying security mechanisms into the enterprise network 500, monitoring the enterprise network 500 through the security mechanisms, detecting and redirecting apparent threats, and analyzing network activity resulting from the apparent threat. To provide security for the enterprise network 500, in various implementations the deception center 598 may communicate with sensors 590 installed in the enterprise network 500, using, for example, network tunnels 580. The tunnels 580 may allow the deception center 598 to be located in a different sub-network ("subnet") than the enterprise network 500, on a different network, or remote from the enterprise network 500, with intermediate networks between the deception center 598 and the enterprise network 500. In some implementations, the enterprise network 500 can include more than one deception center 598. In some implementations, the deception center may be located off-site, such as in an external network 550.

In some implementations, the security services provider 596 may act as a central hub for providing security to multiple site networks, possibly including site networks controlled by different organizations. For example, the security services provider 596 may communicate with multiple deception centers 598 that each provide security for a different enterprise network 500 for the same organization. As another example, the security services provider 596 may coordinate the activities of the deception center 598 and the sensors 590, such as enabling the deception center 598 and the sensors 590 to connect to each other. In some implementations, the security services provider 596 is located outside the enterprise network 500. In some implementations, the security services provider 596 is controlled by a different entity than the entity that controls the site network.

For example, the security services provider 596 may be an outside vendor. In some implementations, the security services provider 596 is controlled by the same entity as that controls the enterprise network 500. In some implementations, the network security system does not include a security services provider 596.

FIG. 5 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 6:
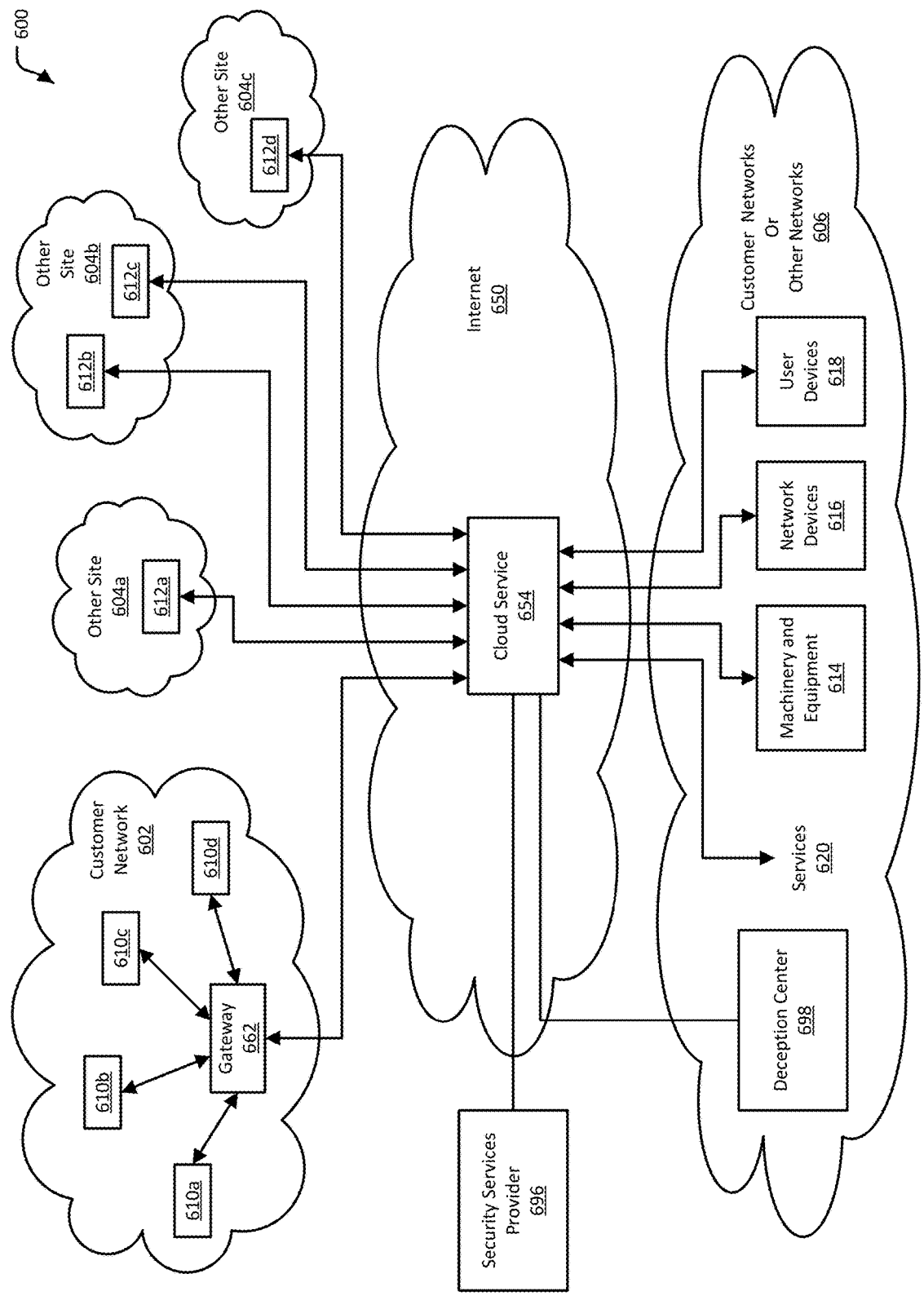
FIG. 6 illustrates a general example of an Internet-of-Things network.

FIG. 6 illustrates a general example of an IoT network 600. The example IoT network 600 can be implemented wherever sensors, actuators, and control systems can be found. For example, the example IoT network 600 can be implemented for buildings, roads and bridges, agriculture, transportation and logistics, utilities, air traffic control, factories, and private homes, among others. In various implementations, the IoT network 600 includes cloud service 654 that collects data from various sensors 610a-610d, 612a-612d, located in various locations. Using the collected data, the cloud service 654 can provide services 620, control of machinery and equipment 614, exchange of data with traditional network devices 616, and/or exchange of data with user devices 618. In some implementations, the cloud service 654 can work with a deception center 698 and/or a security service provider 696 to provide security for the network 600.

A cloud service, such as the illustrated cloud service 654, is a resource provided over the Internet 650. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 654 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 654 is part of one integrated system, run by one entity. For example, the cloud service 654 can be part of a traffic control system. In this example, sensors 610a-610d, 612a-612d can be used to monitor traffic and road conditions. In this example, the service 654 can attempt to optimize the flow of traffic and also provide traffic safety. For example, the sensors 610a-610d, 612a-612d can include a sensor 612a on a bridge that monitors ice formation. When the sensor 612a detects that ice has formed on the bridge, the sensor 612a can alert the cloud service 654. The cloud service 654, can respond by interacting with machinery and equipment 614 that manages traffic in the area of the bridge. For example, the cloud service 654 can turn on warning signs, indicating to drivers that the bridge is icy. Generally, the interaction between the sensor 612a, the cloud service 654, and the machinery and equipment 614 is automated, requiring little or no management by human operators.

In various implementations, the cloud service 654 collects or receives data from sensors 610a-610d, 612a-612d, distributed across one or more networks. The sensors 610a-610d, 612a-612d include devices capable of "sensing" information, such as air or water temperature, air pressure, weight, motion, humidity, fluid levels, noise levels, and so on. The sensors 610a-610d, 612a-612d can alternatively or additionally include devices capable of receiving input, such as cameras, microphones, touch pads, keyboards, key pads, and so on. In some cases, a group of sensors 610a-610d may be common to one customer network 602. For example, the sensors 610a-610d may be motion sensors, traffic cameras, temperature sensors, and other sensors for monitoring traffic in a city's metro area. In this example, the sensors 610a-610d can be located in one area of the city, or be distribute across the city, and be connected to a common network. In these cases, the sensors 610a-610d can communicate with a gateway device 6142, such as a network gateway. The gateway 6142 can further communicate with the cloud service 654.

In some cases, in addition to receiving data from sensors 610a-610d in one customer network 602, the cloud service 654 can also receive data from sensors 612a-612d in other sites 604a-604c. These other sites 604a-604c can be part of the same customer network 602 or can be unrelated to the customer network 602. For example, the other sites 604a-604c can each be the metro area of a different city, and the sensors 612a-612d can be monitoring traffic for each individual city.

Generally, communication between the cloud service 654 and the sensors 610a-610d, 612a-612d is bidirectional. For example, the sensors 610a-610d, 612a-612d can send information to the cloud service 654. The cloud service 654 can further provide configuration and control information to the sensors 610a-610d, 612a-612d. For example, the cloud service 654 can enable or disable a sensor 610a-610d, 612a-612d or modify the operation of a sensor 610a-610d, 612a-612d, such as changing the format of the data provided by a sensor 610a-610d, 612a-612d or upgrading the firmware of a sensor 610a-610d, 612a-612d.

In various implementations, the cloud service 654 can operate on the data received from the sensors 610a-610d, 612a-612d, and use this data to interact with services 620 provided by the cloud service 654, or to interact with machinery and equipment 614, network devices 616, and/or user devices 618 available to the cloud service 654. Services 620 can include software-based services, such as cloud-based applications, website services, or data management services. Services 620 can alternatively or additionally include media, such as streaming video or music or other entertainment services. Services 620 can also include delivery and/or coordination of physical assets, such as for example package delivery, direction of vehicles for passenger pickup and drop-off, or automate re-ordering and re-stocking of supplies. In various implementations, services 620 may be delivered to and used by the machinery and equipment 614, the network devices 616, and/or the user devices 618.

In various implementations, the machinery and equipment 614 can include physical systems that can be controlled by the cloud service 654. Examples of machinery and equipment 614 include factory equipment, trains, electrical street cars, self-driving cars, traffic lights, gate and door locks, and so on. In various implementations, the cloud service 654 can provide configuration and control of the machinery and equipment 614 in an automated fashion.

The network devices 616 can include traditional networking equipment, such as server computers, data storage devices, routers, switches, gateways, and so on. In various implementations, the cloud service 654 can provide control and management of the network devices 616, such as for example automated upgrading of software, security monitoring, or asset tracking. Alternatively or additionally, in various implementations the cloud service 654 can exchange data with the network devices 616, such as for example providing websites, providing stock trading data, or providing online shopping resources, among others. Alternatively or additionally, the network devices 616 can include computing systems used by the cloud service provider to manage the cloud service 654.

The user devices 618 can include individual personal computers, smart phones, tablet devices, smart watches, fitness trackers, medical devices, and so on that can be associated with an individual user. The cloud service 654 can exchange data with the user devices 618, such as for example provide support for applications installed on the user devices 618, providing websites, providing streaming media, providing directional navigation services, and so on. Alternatively or additionally, the cloud service 654 may enable a user to use a user device 618 to access and/or view other devices, such as the sensors 610a-610d, 612a-612d, the machinery and equipment 614, or the network devices 616.

In various implementations, the services 620, machinery and equipment 614, network devices 616, and user devices 618 may be part of one customer network 606. In some cases, this customer network 606 is the same as the customer network 602 that includes the sensors 610a-610d. In some cases, the services 620, machinery and equipment 614, network devices 616, and user devices 618 are part of the same network, and may instead be part of various other networks 606.

In various implementations, customer networks can include a deception center 698. The deception center 698 provides network security for the IoT network 600 by deploying security mechanisms into the IoT network 600, monitoring the IoT network 600 through the security mechanisms, detecting and redirecting apparent threats, and analyzing network activity resulting from the apparent threat. To provide security for the IoT network 600, in various implementations the deception center 698 may communicate with the sensors 610a-6106d, 612a-612d installed in the IoT network 600, for example through the cloud service 654. In some implementations, the IoT network 600 can include more than one deception center 698. For example, each of customer network 602 and customer networks or other networks 606 can include a deception center 698.

In some implementations, the deception center 698 and the sensors 610a-610d, 612a-612d interact with a security services provider 696. In some implementations, the security services provider 696 may act as a central hub for providing security to multiple site networks, possibly including site networks controlled by different organizations. For example, the security services provider 696 may communicate with multiple deception centers 698 that each provide security for a different IoT network 600 for the same organization. As another example, the security services provider 696 may coordinate the activities of the deception center 698 and the sensors 610a-610d, 612a-612d, such as enabling the deception center 698 and the sensors 610a-610d, 612a-612d to connect to each other. In some implementations, the security services provider 696 is integrated into the cloud service 654. In some implementations, the security services provider 696 is controlled by a different entity than the entity that controls the site network. For example, the security services provider 696 may be an outside vendor. In some implementations, the security services provider 696 is controlled by the same entity as that controls the IoT network 600. In some implementations, the network security system does not include a security services provider 696.

Figure 7:
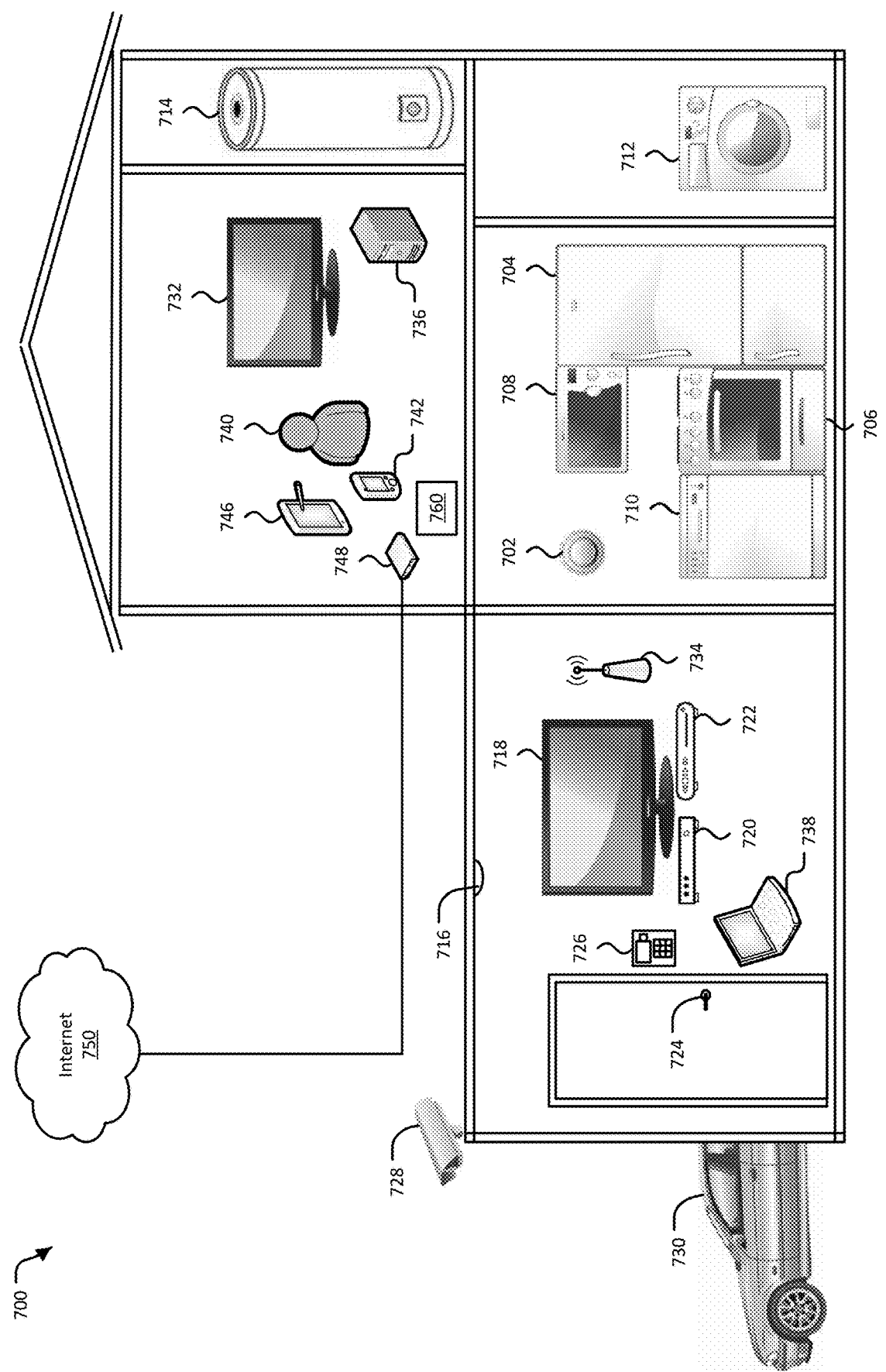
FIG. 7 illustrates an example of an Internet-of-Things network, here implemented in a private home.

IoT networks can also include small networks of non-traditional devices. FIG. 7 illustrates an example of a customer network that is a small network 700, here implemented in a private home. A network for a home is an example of small network that may have both traditional and non-traditional network devices connected to the network 700, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 700.

The example network 700 of FIG. 7 may be a single network, or may include multiple sub-networks. These sub-networks may or may not communicate with each other. For example, the network 700 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 700 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 1702.15.4), Bluetooth™, and Wi-Fi (also known as IEEE 1702.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 1702.3), token ring (also known as IEEE 1702.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 700 implemented in a home is one that may include both traditional network devices and non-traditional, everyday electronics and appliances that have also been connected to the network 700. Examples of rooms where one may find non-traditional devices connected to the network are the kitchen and laundry rooms. For example, in the kitchen a refrigerator 704, oven 706, microwave 708, and dishwasher 710 may be connected to the network 700, and in the laundry room a washing machine 712 may be connected to the network 700. By attaching these appliances to the network 700, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 704 may detect that a certain product is running low, and may place an order with a grocery delivery service for the product to be restocked.

The network 700 may also include environmental appliances, such as a thermostat 702 and a water heater 714. By having these devices connected to the network 700, the homeowner can monitor the current environment of the house (e.g., the air temperature or the hot water temperature), and adjust the settings of these appliances while at home or away. Furthermore, software on the network 700 or on the Internet 750 may track energy usage for the heating and cooling units and the water heater 714. This software may also track energy usage for the other devices, such as the kitchen and laundry room appliances. The energy usage of each appliance may be available to the homeowner over the network 700.

In the living room, various home electronics may be on the network 700. These electronics may have once been fully analog or may have been standalone devices, but now include a network connection for exchanging data with other devices in the network 700 or with the Internet 750. The home electronics in this example include a television 718, a gaming system 720, and a media device 722 (e.g., a video and/or audio player). Each of these devices may play media hosted, for example, on network attached storage 736 located elsewhere in the network 700, or media hosted on the Internet 750.

The network 700 may also include home safety and security devices, such as a smoke alarm 716, an electronic door lock 724, and a home security system 726. Having these devices on the network may allow the homeowner to track the information monitored and/or sensed by these devices, both when the homeowner is at home and away from the house. For example, the homeowner may be able to view a video feed from a security camera 728. When the safety and security devices detect a problem, they may also inform the homeowner. For example, the smoke detector 716 may send an alert to the homeowner's smartphone when it detects smoke, or the electronic door lock 724 may alert the homeowner when there has been a forced entry. Furthermore, the homeowner may be able to remotely control these devices. For example, the homeowner may be able to remotely open the electronic door lock 724 for a family member who has been locked out. The safety and security devices may also use their connection to the network to call the fire department or police if necessary.

Another non-traditional device that may be found in the network 700 is the family car 730. The car 730 is one of many devices, such as laptop computers 738, tablets 746, and smartphones 742, that connect to the network 700 when at home, and when not at home, may be able to connect to the network 700 over the Internet 750. Connecting to the network 700 over the Internet 750 may provide the homeowner with remote access to his network. The network 700 may be able to provide information to the car 730 and receive information from the car 730 while the car is away. For example, the network 700 may be able to track the location of the car 730 while the car 730 is away.

In the home office and elsewhere around the house, this example network 700 includes some traditional devices connected to the network 700. For example, the home office may include a desktop computer 732 and network attached storage 736. Elsewhere around the house, this example includes a laptop computer 738 and handheld devices such as a tablet computer 746 and a smartphone 742. In this example, a person 740 is also connected to the network 700. The person 740 may be connected to the network 700 wirelessly through personal devices worn by the person 740, such as a smart watch, fitness tracker, or heart rate monitor. The person 740 may alternatively or additionally be connected to the network 700 through a network-enabled medical device, such as a pacemaker, heart monitor, or drug delivery system, which may be worn or implanted.

The desktop computer 732, laptop computer 738, tablet computer 746, and/or smartphone 742 may provide an interface that allows the homeowner to monitor and control the various devices connected to the network. Some of these devices, such as the laptop computer 738, the tablet computer 746, and the smartphone 742 may also leave the house, and provide remote access to the network 700 over the Internet 750. In many cases, however, each device on the network may have its own software for monitoring and controlling only that one device. For example, the thermostat 702 may use one application while the media device 722 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 700.

The small network 700 in this example may also include network infrastructure devices, such as a router or switch (not shown) and a wireless base station 734. The wireless base station 734 may provide a wireless network for the house. The router or switch may provide a wired network for the house. The wireless base station 734 may be connected to the router or switch to provide a wireless network that is an extension of the wired network. The router or switch may be connected to a gateway device 748 that connects the network 700 to other networks, including the Internet 750. In some cases, a router or switch may be integrated into the gateway device 748. The gateway device 748 is a cable modem, digital subscriber line (DSL) modem, optical modem, analog modem, or some other device that connects the network 700 to an ISP. The ISP may provide access to the Internet 750. Typically, a home network only has one gateway device 748. In some cases, the network 700 may not be connected to any networks outside of the house. In these cases, information about the network 700 and control of devices in the network 700 may not be available when the homeowner is not connected to the network 700; that is, the homeowner may not have access to his network 700 over the Internet 750.

Typically, the gateway device 748 includes a hardware and/or software firewall. A firewall monitors incoming and outgoing network traffic and, by applying security rules to the network traffic, attempts to keep harmful network traffic out of the network 700. In many cases, a firewall is the only security system protecting the network 700. While a firewall may work for some types of intrusion attempts originating outside the network 700, the firewall may not block all intrusion mechanisms, particularly intrusions mechanisms hidden in legitimate network traffic. Furthermore, while a firewall may block intrusions originating on the Internet 750, the firewall may not detect intrusions originating from within the network 700. For example, an infiltrator may get into the network 700 by connecting to signal from the Wi-Fi base station 734. Alternatively, the infiltrator may connect to the network 700 by physically connecting, for example, to the washing machine 712. The washing machine 712 may have a port that a service technician can connect to service the machine. Alternatively or additionally, the washing machine 712 may have a simple Universal Serial Bus (USB) port. Once an intruder has gained access to the washing machine 712, the intruder may have access to the rest of the network 700.

To provide more security for the network 700, a deception-based network security device 760 can be added to the network 700. In some implementations, the security device 760 is a standalone device that can be added to the network 700 by connecting it to a router or switch. In some implementations, the security device 760 can alternatively or additionally be connected to the network's 700 wireless sub-network by powering on the security device 760 and providing it with Wi-Fi credentials. The security device 760 may have a touchscreen, or a screen and a keypad, for inputting Wi-Fi credentials. Alternatively or additionally, the homeowner may be able to enter network information into the security device by logging into the security device 760 over a Bluetooth™ or Wi-Fi signal using software on a smartphone, tablet, or laptop, or using a web browser. In some implementations, the security device 760 can be connected to a sub-network running over the home's electrical wiring by connecting the security device 760 to a power outlet. In some implementations, the security device 760 may have ports, interfaces, and/or radio antennas for connecting to the various sub-networks that can be included in the network 700. This may be useful, for example, when the sub-networks do not communicate with each other, or do not communicate with each other seamlessly. Once powered on and connected, the security device 760 may self-configure and monitor the security of each sub-network in the network 700 that it is connected to.

In some implementations, the security device 760 may be configured to connect between the gateway device 748 and the network's 700 primary router, and/or between the gateway device 748 and the gateway device's 748 connection to the wall. Connected in one or both of these locations, the security device 748 may be able to control the network's 700 connection with outside networks. For example, the security device can disconnect the network 700 from the Internet 750.

In some implementations, the security device 760, instead of being implemented as a standalone device, may be integrated into one or more of the appliances, home electronics, or computing devices (in this example network 700), or in some other device not illustrated here. For example, the security device 760—or the functionality of the security device 760—may be incorporated into the gateway device 748 or a desktop computer 732 or a laptop computer 738. As another example, the security device 760 can be integrated into a kitchen appliance (e.g., the refrigerator 704 or microwave 708), a home media device (e.g., the television 718 or gaming system 720), or the home's security system 726. In some implementations, the security device 760 may be a printed circuit board that can be added to another device without requiring significant changes to the other device. In some implementations, the security device 760 may be implemented using an Application Specific Integrated Circuit (ASIC) or Field Programmable Gate Array (FPGA) that can be added to the electronics of a device. In some implementations, the security device 760 may be implemented as a software module or modules that can run concurrently with the operating system or firmware of a networked device. In some implementations, the security device 760 may have a physical or virtual security barrier that prevents access to it by the device that it is integrated into. In some implementations, the security device's 760 presence in another device may be hidden from the device into which the security device 760 is integrated.

In various implementations, the security device 760 may scan the network 700 to determine which devices are present in the network 700. Alternatively or additionally, the security device 760 may communicate with a central controller in the network 700 (or multiple central controllers, when there are sub-networks, each with their own central controller) to learn which devices are connected to the network 700. In some implementations, the security device 760 may undergo a learning period, during which the security device 760 learns the normal activity of the network 700, such as what time of day appliances and electronics are used, what they are used for, and/or what data is transferred to and from these devices. During the learning period, the security device 760 may alert the homeowner to any unusual or suspicious activity. The homeowner may indicate that this activity is acceptable, or may indicate that the activity is an intrusion. As described below, the security device 760 may subsequently take preventive action against the intrusion.

Once the security device 760 has learned the topology and/or activity of the network 700, the security device 760 may be able to provide deception-based security for the network 700. In some implementations, the security device 760 may deploy security mechanisms that are configured to emulate devices that could be found in the network 700. In some implementations, the security device 760 may monitor activity on the network 700, including watching the data sent between the various devices on the network 700, and between the devices and the Internet 750. The security device 760 may be looking for activity that is unusual, unexpected, or readily identifiable as suspect. Upon detecting suspicious activity in the network 700, the security device 760 may deploy deceptive security mechanisms.

In some implementations, the deceptive security mechanisms are software processes running on the security device 760 that emulate devices that may be found in the network 700. In some implementations, the security device 760 may be assisted in emulating the security devices by another device on the network 700, such as the desktop computer 732. From the perspective of devices connected to the network 700, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 760 itself; thus, while, from the point of view of the network 700, the network 700 appears to have additional devices, no physical equivalent (other than the security device 760) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 700. Furthermore, the security mechanisms emulate devices that are likely to be found in the network 700, such as a second television, a second thermostat, or another laptop computer. In some implementations, the security device 760 may contact a service on the Internet 750 for assistance in selecting devices to emulate and/or for how to configure emulated devices. The security devices 760 may select and configure security mechanisms to be attractive to intrusions attempts, and to deflect attention away from more valuable or vulnerable network assets. Additionally, the security mechanisms can assist in confirming that an intrusion into the network 700 has actually taken place.

In some implementations, the security device 760 may deploy deceptive security mechanisms in advance of detecting any suspicious activity. For example, having scanned the network, the security device 760 may determine that the network 700 includes only one television 718 and one smoke detector 716. The security device 760 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 700 real devices.

In some implementations, the security mechanisms deployed by the security device 760 may take into account specific requirements of the network 700 and/or the type of devices that can be emulated. For example, in some cases, the network 700 (or a sub-network) may assign identifiers to each device connected to the network 700, and/or each device may be required to adopt a unique identifier. In these cases, the security device 760 may assign an identifier to deployed security mechanisms that do not interfere with identifiers used by actual devices in the network 700. As another example, in some cases, devices on the network 700 may register themselves with a central controller and/or with a central service on the Internet 750. For example, the thermostat 702 may register with a service on the Internet 750 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 760 may determine to deploy security mechanisms that emulate other devices, and avoid registering with the central controller or central service.

In some implementations, the security device 760 may dynamically adjust the security mechanisms that it has deployed. For example, when the homeowner adds devices to the network 700, the security device 760 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 700, the security device 760 may add a security mechanism that mimics the device that was removed. As another example, the security device may change the activity of a security mechanism, for example, to reflect changes in the normal activity of the home, changes in the weather, the time of year, the occurrence of special events, and so on.

The security device 760 may also dynamically adjust the security mechanisms it has deployed in response to suspicious activity it has detected on the network 700. For example, upon detecting suspicious activity, the security device 760 may change the behavior of a security mechanism or may deploy additional security mechanisms. The changes to the security mechanisms may be directed by the suspicious activity, meaning that if, for example, the suspicious activity appears to be probing for a wireless base station 734, the security device 760 may deploy a decoy wireless base station.

Changes to the security mechanisms are meant not only to attract a possible intrusion, but also to confirm that an intrusion has, in fact occurred. Since the security mechanisms are not part of the normal operation of the network 700, normal occupants of the home are not expected to access the security mechanisms. Thus, in most cases, any access of a security mechanism is suspect. Once the security device 760 has detected an access to a security mechanism, the security device 760 may next attempt to confirm that an intrusion into the network 700 has taken place. An intrusion can be confirmed, for example, by monitoring activity at the security mechanism. For example, login attempts, probing of data emulated by the security mechanism, copying of data from the security mechanism, and attempts to log into another part of the network 700 from the security mechanism indicate a high likelihood that an intrusion has occurred.

Once the security device 760 is able to confirm an intrusion into the network 700, the security device 760 may alert the homeowner. For example, the security device 760 may sound an audible alarm, send an email or text message to the homeowner or some other designated persons, and/or send an alert to an application running on a smartphone or tablet. As another example, the security device 760 may access other network devices and, for example, flash lights, trigger the security system's 726 alarm, and/or display messages on devices that include display screens, such as the television 718 or refrigerator 704. In some implementations, depending on the nature of the intrusion, the security device 760 may alert authorities such as the police or fire department.

In some implementations, the security device 760 may also take preventive actions. For example, when an intrusion appears to have originated outside the network 700, the security device 760 may block the network's 700 access to the Internet 750, thus possibly cutting off the intrusion. As another example, when the intrusion appears to have originated from within the network 700, the security device 760 may isolate any apparently compromised devices, for example by disconnecting them from the network 700. When only its own security mechanisms are compromised, the security device 760 may isolate itself from the rest of the network 700. As another example, when the security device 760 is able to determine that the intrusion very likely included physical intrusion into the house, the security device 760 may alert the authorities. The security device 760 may further lock down the house by, for example, locking any electronic door locks 724.

In some implementations, the security device 760 may be able to enable a homeowner to monitor the network 700 when a suspicious activity has been detected, or at any other time. For example, the homeowner may be provided with a software application that can be installed on a smartphone, tablet, desktop, and/or laptop computer. The software application may receive information from the security device 760 over a wired or wireless connection. Alternatively or additionally, the homeowner may be able to access information about his network through a web browser, where the security device 760 formats webpages for displaying the information. Alternatively or additionally, the security device 760 may itself have a touchscreen or a screen and key pad that provide information about the network 700 to the homeowner.

The information provided to the homeowner may include, for example, a list and/or graphic display of the devices connected to the network 700. The information may further provide a real-time status of each device, such as whether the device is on or off, the current activity of the device, data being transferred to or from the device, and/or the current user of the device, among other things. The list or graphic display may update as devices connect and disconnect from the network 700, such as for example laptops and smartphones connecting to or disconnecting from a wireless sub-network in the network 700. The security device 760 may further alert the homeowner when a device has unexpectedly been disconnected from the network 700. The security device 760 may further alert the homeowner when an unknown device connects to the network 700, such as for example when a device that is not known to the homeowner connects to the Wi-Fi signal.

The security device 760 may also maintain historic information. For example, the security device 760 may provide snapshots of the network 700 taken once a day, once a week, or once a month. The security device 760 may further provide a list of devices that have, for example, connected to the wireless signal in the last hour or day, at what times, and for how long. The security device 760 may also be able to provide identification information for these devices, such as MAC addresses or usernames. As another example, the security device 760 may also maintain usage statistics for each device in the network 700, such as for example the times at which each device was in use, what the device was used for, how much energy the device used, and so on.

The software application or web browser or display interface that provides the homeowner with information about his network 700 may also enable the homeowner to make changes to the network 700 or to devices in the network 700. For example, through the security device 760, the homeowner may be able to turn devices on or off, change the configuration of a device, change a password for a device or for the network, and so on.

In some implementations, the security device 760 may also display currently deployed security mechanisms and their configuration. In some implementations, the security device 760 may also display activity seen at the security mechanisms, such as for example a suspicious access to a security mechanism. In some implementations, the security device 760 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 760 thus can provide sophisticated security for a small network. The security device 760 may be simple to add to a network, yet provide comprehensive protection against both external and internal intrusions. Moreover, the security device 760 may be able to monitor multiple sub-networks that are each using different protocols. The security device 760, using deceptive security mechanisms, may be able to detect and confirm intrusions into the network 700. The security device 760 may be able to take preventive actions when an intrusion occurs. The security device 760 may also be able to provide the homeowner with information about his network, and possibly also control over devices in the network.

Figure 8:
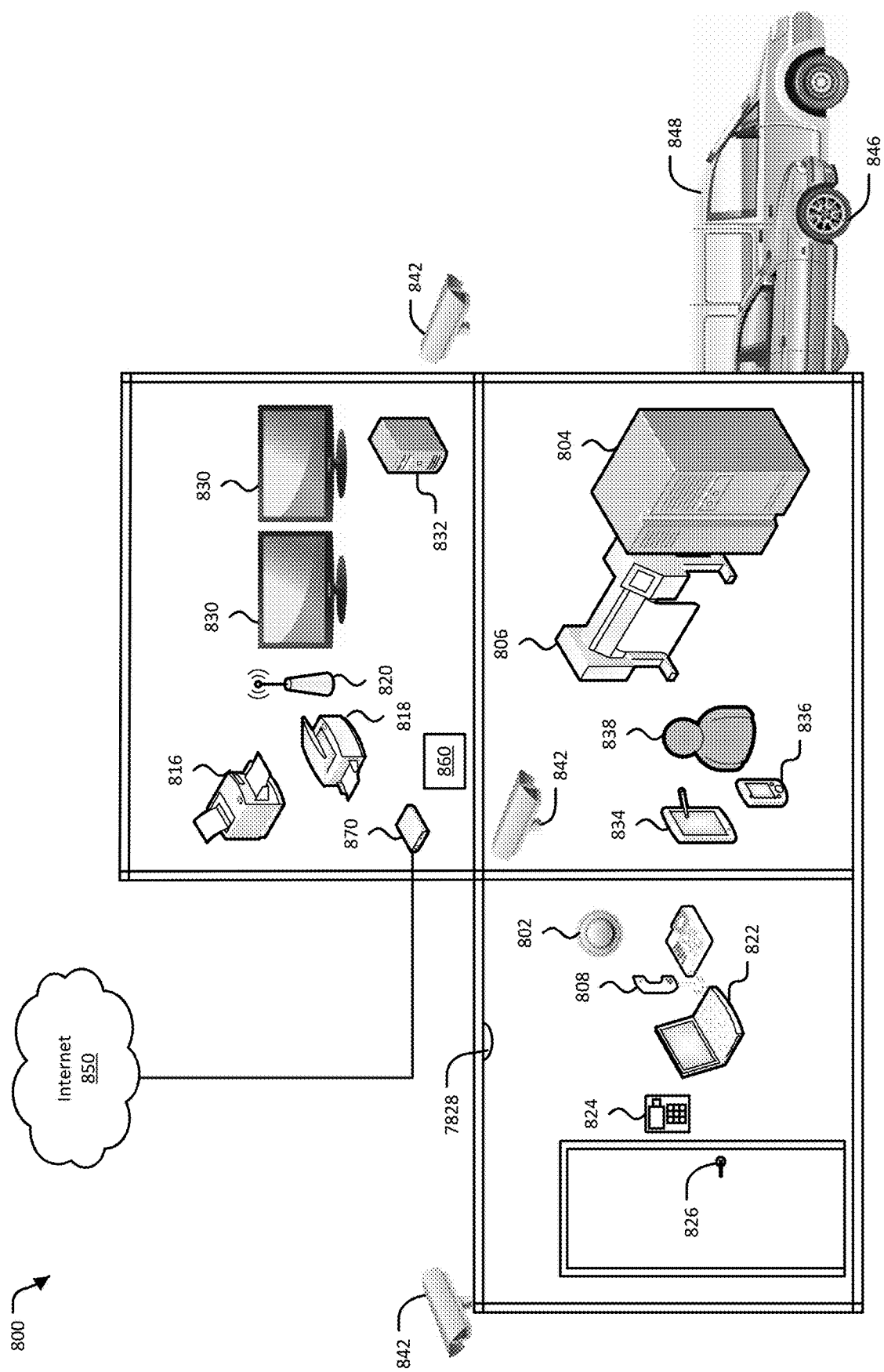
FIG. 8 illustrates of an Internet-of-Things network, here implemented in a small business.

FIG. 8 illustrates another example of a small network 800, here implemented in a small business. A network in a small business may have both traditional and non-traditional devices connected to the network 800. Small business networks are also examples of networks that are often implemented with minimal security. A small business owner may not have the financial or technical resources, time, or expertise to configure a sophisticated security infrastructure for her network 800. The business owner, however, is likely able to at least set up a network 800 for the operation of the business. A deception-based network security device that is at least as simple to set up as the network 800 itself may provide inexpensive and simple yet sophisticated security for the network 800.

The example network 800 may be one, single network, or may include multiple sub-networks. For example, the network 800 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 800. The wireless network may be implemented using a wireless base station 820, or several wireless base stations, which provide a wireless signal throughout the business. The network 800 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 800 may not be configured to or able to communicate with each other.

As noted above, the small business network 800 may include both computers, network infrastructure devices, and other devices not traditionally found in a network. The network 800 may also include electronics, machinery, and systems that have been connected to the network 800 according to an Internet-of-Things approach. Workshop machinery that was once purely analog may now have computer controls. Digital workshop equipment may be network-enabled. By connecting shop equipment and machinery to the network 800, automation and efficiency of the business can be improved and orders, materials, and inventory can be tracked. Having more devices on the network 800, however, may increase the number of vulnerabilities in the network 800. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 8 includes a front office. In the front office, the network may include devices for administrative tasks. These devices may include, for example, a laptop 822 and a telephone 808. These devices may be attached to the network 800 in order to, for example, access records related to the business, which may be stored on a server 832 located elsewhere in the building. In the front office, security devices for the building may also be found, including, for example, security system controls 824 and an electronic door lock 826. Having the security devices on the network 800 may enable the business owner to remotely control access to the building. The business owner may also be able to remotely monitor the security of building, such as for example being able to view video streams from security cameras 842. The front office may also be where environmental controls, such as a thermostat 802, are located. Having the thermostat 802 on the network 800 may allow the business owner to remotely control the temperature settings. A network-enabled thermostat 802 may also track energy usage for the heating and cooling systems. The front office may also include safety devices, such as a network-connected smoke alarm 828. A network-connected smoke alarm may be able to inform the business owner that there is a problem in the building be connecting to the business owner's smartphone or computer.

Another workspace in this example small business is a workshop. In the workshop, the network 800 may include production equipment for producing the goods sold by the business. The production equipment may include, for example, manufacturing machines 804 (e.g. a milling machine, a Computer Numerical Control (CNC) machine, a 3D printer, or some other machine tool) and a plotter 806. The production equipment may be controlled by a computer on the network 800, and/or may receive product designs over the network 800 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 838 may also be connected to the network 800. Mobile computing devices include, for example, tablet computers 834 and smartphones 836. These devices may be used to control production equipment, track supplies and inventory, receive and track orders, and/or for other operations of the business. People 838 may be connected to the network through network-connected devices worn or implanted in the people 838, such as for example smart watches, fitness trackers, heart rate monitors, drug delivery systems, pacemakers, and so on.

At a loading dock, the example small business may have a delivery van 848 and a company car 846. When these vehicles are away from the business, they may be connected to the network 800 remotely, for example over the Internet 850. By being able to communicate with the network 800, the vehicles may be able to receive information such as product delivery information (e.g., orders, addresses, and/or delivery times), supply pickup instructions, and so on. The business owner may also be able to track the location of these vehicles from the business location, or over the Internet 850 when away from the business, and/or track who is using the vehicles.

The business may also have a back office. In the back office, the network 800 may include traditional network devices, such as computers 830, a multi-function printer 816, a scanner 818, and a server 832. In this example, the computers 830 may be used to design products for manufacturing in the workshop, as well as for management of the business, including tracking orders, supplies, inventory, and/or human resources records. The multi-function printer 816 and scanner 832 may support the design work and the running of the business. The server 832 may store product designs, orders, supply records, and inventory records, as well as administrative data, such as accounting and human resources data.

The back office may also be where a gateway device 848 is located. The gateway device 848 connects the small business to other networks, including the Internet 850. Typically, the gateway device 848 connects to an ISP, and the ISP provides access to the Internet 850. In some cases, a router may be integrated into the gateway device 848. In some cases, gateway device 848 may be connected to an external router, switch, or hub, not illustrated here. In some cases, the network 800 is not connected to any networks outside of the business's own network 800. In these cases, the network 800 may not have a gateway device 848.

The back office is also where the network 800 may have a deception-based network security device 860. The security device 860 may be a standalone device that may be enabled as soon as it is connected to the network 800. Alternatively or additionally, the security device 860 may be integrated into another device connected to the network 800, such as the gateway device 860, a router, a desktop computer 830, a laptop computer 822, the multi-function printer 816, or the thermostat 802, among others. When integrated into another device, the security device 860 may use the network connection of the other device, or may have its own network connection for connecting to the network 800. The security device 860 may connect to the network 800 using a wired connection or a wireless connection.

Once connected to the network 800, the security device 860 may begin monitoring the network 800 for suspect activity. In some implementations, the security device 860 may scan the network 800 to learn which devices are connected to the network 800. In some cases, the security device 860 may learn the normal activity of the network 800, such as what time the various devices are used, for how long, by whom, for what purpose, and what data is transferred to and from each device, among other things.

In some implementations, having learned the configuration and/or activity of the network 800, the security device 860 may deploy deceptive security mechanisms. These security mechanisms may emulate devices that may be found on the network 800, including having an identifiable device type and/or network identifiers (such as a MAC address and/or IP address), and being able to send and receive network traffic that a device of a certain time would send and receive. For example, for the example small business, the security device 860 may configure a security mechanism to emulate a 3D printer, a wide-body scanner, or an additional security camera. The security device 860 may further avoid configuring a security mechanism to emulate a device that is not likely to be found in the small business, such as a washing machine. The security device 860 may use the deployed security mechanisms to monitor activity on the network 800.

In various implementations, when the security device 860 detects suspect activity, the security device 860 may deploy additional security mechanisms. These additional security mechanisms may be selected based on the nature of suspect activity. For example, when the suspect activity appears to be attempting to break into the shop equipment, the security device 860 may deploy a security mechanism that looks like shop equipment that is easy to hack. In some implementations, the security device 860 may deploy security mechanisms only after detecting suspect activity on the network 800.

The security device 860 selects devices to emulate that are particularly attractive for an infiltration, either because the emulated device appears to have valuable data or because the emulated device appears to be easy to infiltrate, or for some other reason. In some implementations, the security device 860 connects to a service on the Internet 850 for assistance in determining which devices to emulate and/or how to configure the emulated device. Once deployed, the security mechanisms serve as decoys to attract the attention of a possible infiltrator away from valuable network assets. In some implementations, the security device 860 emulates the security mechanisms using software processes. In some implementations, the security device 860 may be assisted in emulating security mechanisms by a computer 830 on the network.

In some implementations, the security device 860 may deploy security mechanisms prior to detecting suspicious activity on the network 800. In these implementations, the security mechanisms may present more attractive targets for a possible, future infiltration, so that if an infiltration occurs, the infiltrator will go after the security mechanisms instead of the actual devices on the network 800.

In various implementations, the security device 860 may also change the security mechanisms that it has deployed. For example, the security device 860 may add or remove security mechanisms as the operation of the business changes, as the activity on the network 800 changes, as devices are added or removed from the network 800, as the time of year changes, and so on.

Besides deflecting a possible network infiltration away from valuable or vulnerable network devices, the security device 860 may use the security mechanisms to confirm that the network 800 has been infiltrated. Because the security mechanisms are not part of actual devices in use by the business, any access to them over the network is suspect. Thus, once the security device 860 detects an access to one of its security mechanisms, the security device 860 may attempt to confirm that this access is, in fact, an unauthorized infiltration of the network 800.

To confirm that a security mechanism has been infiltrated, the security device 860 may monitor activity seen at the security mechanism. The security device 860 may further deploy additional security mechanisms, to see if, for example, it can present an even more attractive target to the possible infiltrator. The security device 860 may further look for certain activity, such as log in attempts to other devices in the network, attempts to examine data on the security mechanism, attempts to move data from the security mechanism to the Internet 850, scanning of the network 800, password breaking attempts, and so on.

Once the security device 860 has confirmed that the network 800 has been infiltrated, the security device 860 may alert the business owner. For example, the security device 860 may sound an audible alarm, email or send text messages to the computers 830 and/or handheld devices 834, 836, send a message to the business's cars 846, 848, flash lights, or trigger the security system's 824 alarm. In some implementations, the security device 860 may also take preventive measures. For example, the security device 860 may disconnect the network 800 from the Internet 850, may disconnect specific devices from the network 800 (e.g., the server 832 or the manufacturing machines 804), may turn some network-connected devices off, and/or may lock the building.

In various implementations, the security device 860 may allow the business owner to monitor her network 800, either when an infiltration is taking place or at any other time. For example, the security device 860 may provide a display of the devices currently connected to the network 800, including flagging any devices connected to the wireless network that do not appear to be part of the business. The security device 860 may further display what each device is currently doing, who is using them, how much energy each device is presently using, and/or how much network bandwidth each device is using. The security device 860 may also be able to store this information and provide historic configuration and/or usage of the network 800.

The security device 860 may have a display it can use to show information to the business owner. Alternatively or additionally, the security device 860 may provide this information to a software application that can run on a desktop or laptop computer, a tablet, or a smartphone. Alternatively or additionally, the security device 860 may format this information for display through a web browser. The business owner may further be able to control devices on the network 800 through an interface provided by the security device 860, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 9:
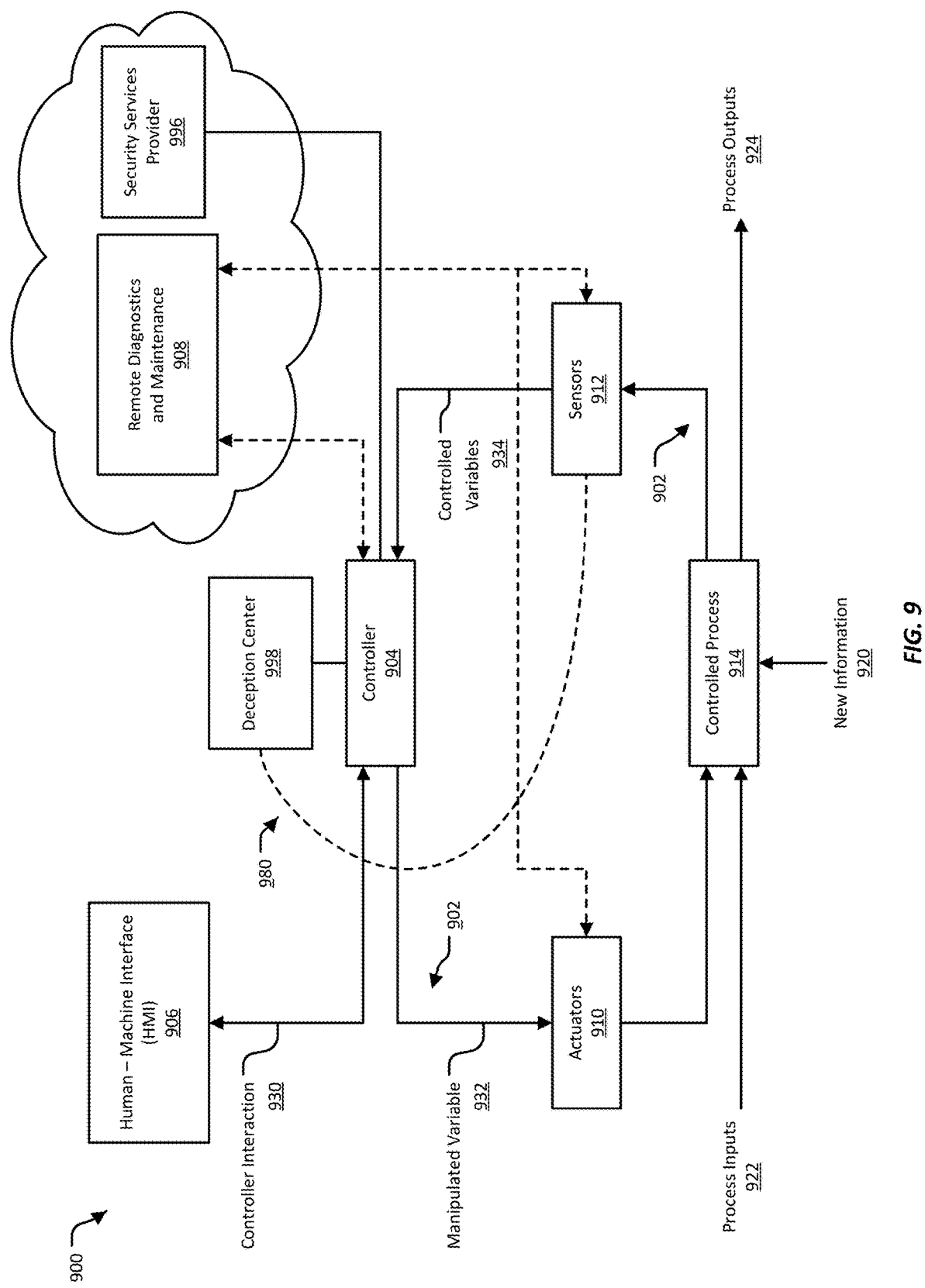
FIG. 9 illustrates an example of the basic operation of an industrial control system.

FIG. 9 illustrates an example of the basic operation of an industrial control system 900. Generally, an industrial control system 900 may include a control loop 902, a human-machine interface 906, and remote diagnostics and maintenance 908. In some implementations, the example industrial control system can be defended by a network threat detection and analysis system, which can include a deception center 998 and a security services provider 996.

A control loop 902 may consist of sensors 912, controller 904 hardware such as PLCs, actuators 910, and the communication of variables 932, 934. The sensors 912 may be used for measuring variables in the system, while the actuators 910 may include, for example, control valves breakers, switches, and motors. Some of the sensors 912 may be deceptions sensors. Controlled variables 934 may be transmitted to the controller 904 from the sensors 934. The controller 904 may interpret the controlled variables 934 and generates corresponding manipulated variables 932, based on set points provided by controller interaction 930. The controller 904 may then transmit the manipulated variables 932 to the actuators 910. The actuators 910 may drive a controlled process 914 (e.g., a machine on an assembly line). The controlled process 914 may accept process inputs 922 (e.g., raw materials) and produce process outputs 924 (e.g., finished products). New information 920 provided to the controlled process 914 may result in new sensor 912 signals, which identify the state of the controlled process 914 and which may also transmitted to the controller 904.

In some implementations, at least some of the sensors 912 can also provide the deception center 998 with visibility into the industrial control system 900, such as for example being able to present or project deceptive security mechanisms into the industrial control system. Additionally, in various implementations, the sensors 910 may provide a portal through which a suspected attack on the industrial control system can be redirected to the deception center 998. The deception center 998 and the sensors 910 may be able to communicate using network tunnels 980.

The deception center 998 provides network security for the industrial control system 900 by deploying security mechanisms into the industrial control system 900, monitoring the industrial control system through the security mechanisms, detecting and redirecting apparent threats, and analyzing network activity resulting from the apparent threat. In some implementations, the industrial control system 900 can include more than one deception center 998. In some implementations, the deception center may be located off-site, such as on the Internet.

In some implementations, the deception center 998 may interact with a security services provider 996 located outside the industrial control system 900. The security services provider 996 may act as a central hub for providing security to multiple sites that are part of the industrial control system 900, and/or for multiple separate, possibly unrelated, industrial control systems. For example, the security services provider 996 may communicate with multiple deception centers 998 that each provide security for a different industrial control system 900 for the same organization. As another example, the security services provider 996 may coordinate the activities of the deception center 998 and the sensors 912, such as enabling the deception center 998 and the sensors 912 to connect to each other. In some implementations, the security services provider 996 is located outside the industrial control system 900. In some implementations, the security services provider 996 is controlled by a different entity than the entity that controls the site network. For example, the security services provider 996 may be an outside vendor. In some implementations, the security services provider 996 is controlled by the same entity as that controls the industrial control system. In some implementations, the network security system does not include a security services provider 996.

The human-machine interface 906 provides operators and engineers with an interface for controller interaction 930. Controller interaction 930 may include monitoring and configuring set points and control algorithms, and adjusting and establishing parameters in the controller 904. The human-machine interface 906 typically also receives information from the controller 904 that allows the human-machine interface 906 to display process status information and historical information about the operation of the control loop 902.

The remote diagnostics and maintenance utilities 908 are typically used to prevent, identify, and recover from abnormal operation or failures. For diagnostics, the remote diagnostics and maintenance utilities 908 may monitor the operation of each of the controller 904, sensors 912, and actuators 910. To recover after a problem, the remote diagnostics and maintenance utilities 908 may provide recovery information and instructions to one or more of the controller 904, sensors 912, and/or actuators 910.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 10:
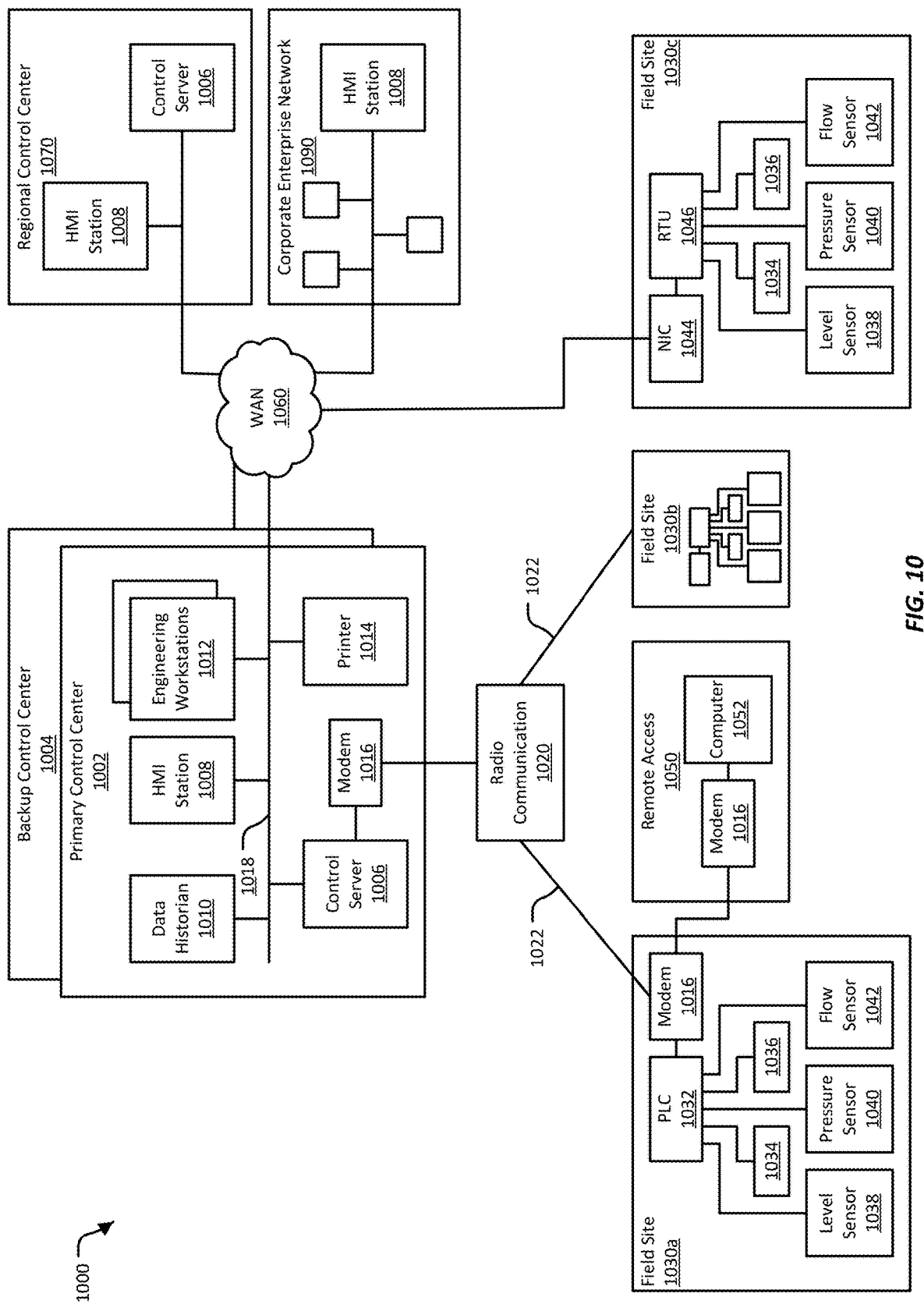
FIG. 10 illustrates an example of a SCADA system, here used for distributed monitoring and control.

FIG. 10 illustrates an example of a SCADA system 1000, here used for distributed monitoring and control. This example SCADA system 1000 includes a primary control center 1002 and three field sites 1030a-1030c. A backup control center 1004 provides redundancy in case of there is a malfunction at the primary control center 1002. The primary control center 1002 in this example includes a control server 1006—which may also be called a SCADA server or a Master Terminal Unit (MTU)—and a local area network (LAN) 1008. The primary control center 1002 may also include a human-machine interface station 1008, a data historian 1010, engineering workstations 1012, and various network equipment such as printers 1014, each connected to the LAN 1008.

The control server 1006 typically acts as the master of the SCADA system 1000. The control server 1006 typically includes supervisory control software that controls lower-level control devices, such as Remote Terminal Units (RTUs) and PLCs, located at the field sites 1030a-1030c. The software may tell the system 1000 what and when to monitor, what parameter ranges are acceptable, and/or what response to initiate when parameters are outside of acceptable values.

The control server 1006 of this example may access Remote Terminal Units and/or PLCs at the field sites 1030a-1030c using a communications infrastructure, which may include radio-based communication devices, telephone lines, cables, and/or satellites. In the illustrated example, the control server 1006 is connected to a modem 1016, which provides communication with serial-based radio communication 1020, such as a radio antenna. Using the radio communication 1020, the control server 1006 can communicate with field sites 1030a-1030b using radiofrequency signals 1022. Some field sites 1030a-1030b may have radio transceivers for communicating back to the control server 1006.

A human-machine interface station 1008 is typically a combination of hardware and software that allows human operators to monitor the state of processes in the SCADA system 1000. The human-machine interface station 1008 may further allow operators to modify control settings to change a control objective, and/or manually override automatic control operations, such as in the event of an emergency. The human-machine interface station 1008 may also allow a control engineer or operator to configure set points or control algorithms and parameters in a controller, such as a Remote Terminal Unit or a PLC. The human-machine interface station 1008 may also display process status information, historical information, reports, and other information to operators, administrators, mangers, business partners, and other authorized users. The location, platform, and interface of a human-machine interface station 1008 may vary. For example, the human-machine interface station 1008 may be a custom, dedicated platform in the primary control center 1002, a laptop on a wireless LAN, or a browser on a system connected to the Internet.

The data historian 1010 in this example is a database for logging all process information within the SCADA system 1000. Information stored in this database can be accessed to support analysis of the system 1000, for example for statistical process control or enterprise level planning.

The backup control center 1004 may include all or most of the same components that are found in the primary control center 1002. In some cases, the backup control center 1004 may temporarily take over for components at the primary control center 1002 that have failed or have been taken offline for maintenance. In some cases, the backup control center 1004 is configured to take over all operations of the primary control center 1012, such as when the primary control center 1012 experiences a complete failure (e.g., is destroyed in a natural disaster).

The primary control center 1002 may collect and log information gathered by the field sites 1030a-1030c and display this information using the human-machine interface station 1008. The primary control center 1002 may also generate actions based on detected events. The primary control center 1002 may, for example, poll field devices at the field sites 1030a-1030c for data at defined intervals (e.g., 5 or 60 seconds), and can send new set points to a field device as required. In addition to polling and issuing high-level commands, the primary control center 1002 may also watch for priority interrupts coming from the alarm systems at the field sites 1030a-1030c.

In this example, the primary control center 1002 uses point-to-point connections to communication with three field sites 1030a-1030c, using radio telemetry for two communications with two of the field sites 1030a-1030b. In this example, the primary control center 1002 uses a wide area network (WAN) 1060 to communicate with the third field site 1030c. In other implementations, the primary control center 1002 may use other communication topologies to communicate with field sites. Other communication topologies include rings, stars, meshes, trees, lines or series, and busses or multi-drops, among others. Standard and proprietary communication protocols may be used to transport information between the primary control center 1002 and field sites 1030a-1030c. These protocols may use telemetry techniques such as provided by telephone lines, cables, fiber optics, and/or radiofrequency transmissions such as broadcast, microwave, and/or satellite communications.

The field sites 1030a-1030c in this example perform local control of actuators and monitor local sensors. For example, a first field site 1030a may include a PLC 1032. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 1032 at a field site, such as the first field site 1030a, may control local actuators 1034, 1036 and monitor local sensors 1038, 1040, 1042. Examples of actuators include valves 1034 and pumps 1036, among others. Examples of sensors include level sensors 1038, pressure sensors 1040, and flow sensors 1042, among others. Any of the actuators 1034, 1036 or sensors 1038, 1040, 1042 may be "smart" actuators or sensors, more commonly called intelligent electronic devices (IEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 1006. Alternatively or additionally, a local Remote Terminal Unit may poll intelligent electronic devices to collect data, which it may then pass to the control server 1006.

Field sites 1030a-1030c are often equipped with remote access capability that allows field operators to perform remote diagnostics and repairs. For example, the first remote 1030a may include a modem 1016 connected to the PLC 1032. A remote access 1050 site may be able to, using a dial up connection, connect to the modem 1016. The remote access 1050 site may include its own modem 1016 for dialing into to the remote station 1030a over a telephone line. At the remote site 1050, an operator may use a computer 1052 connected to the modem 1016 to perform diagnostics and repairs on the first remote site 1030a.

The example SCADA system 1000 includes a second field site 1030b, which may be provisioned in substantially the same way as the first field site 1030a, having at least a modem and a PLC or Remote Terminal that controls and monitors some number of actuators and sensors.

The example SCADA system 1000 also includes a third field site 1030c that includes a network interface card (NIC) 1044 for communicating with the system's 1000 WAN 1060. In this example, the third field site 1030c includes a Remote Terminal Unit 1046 that is responsible for controlling local actuators 1034, 1036 and monitoring local sensors 1038, 1040, 1042. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 1000 of this example also includes a regional control center 1070 and a corporate enterprise network 1090. The regional control center 1070 may provide a higher level of supervisory control. The regional control center 1070 may include at least a human-machine interface station 1008 and a control server 1006 that may have supervisory control over the control server 1006 at the primary control center 1002. The corporate enterprise network 1090 typically has access, through the system's 1000 WAN 1060, to all the control centers 1002, 1004 and to the field sites 1030a-1030c. The corporate enterprise network 1090 may include a human-machine interface station 1008 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 11:
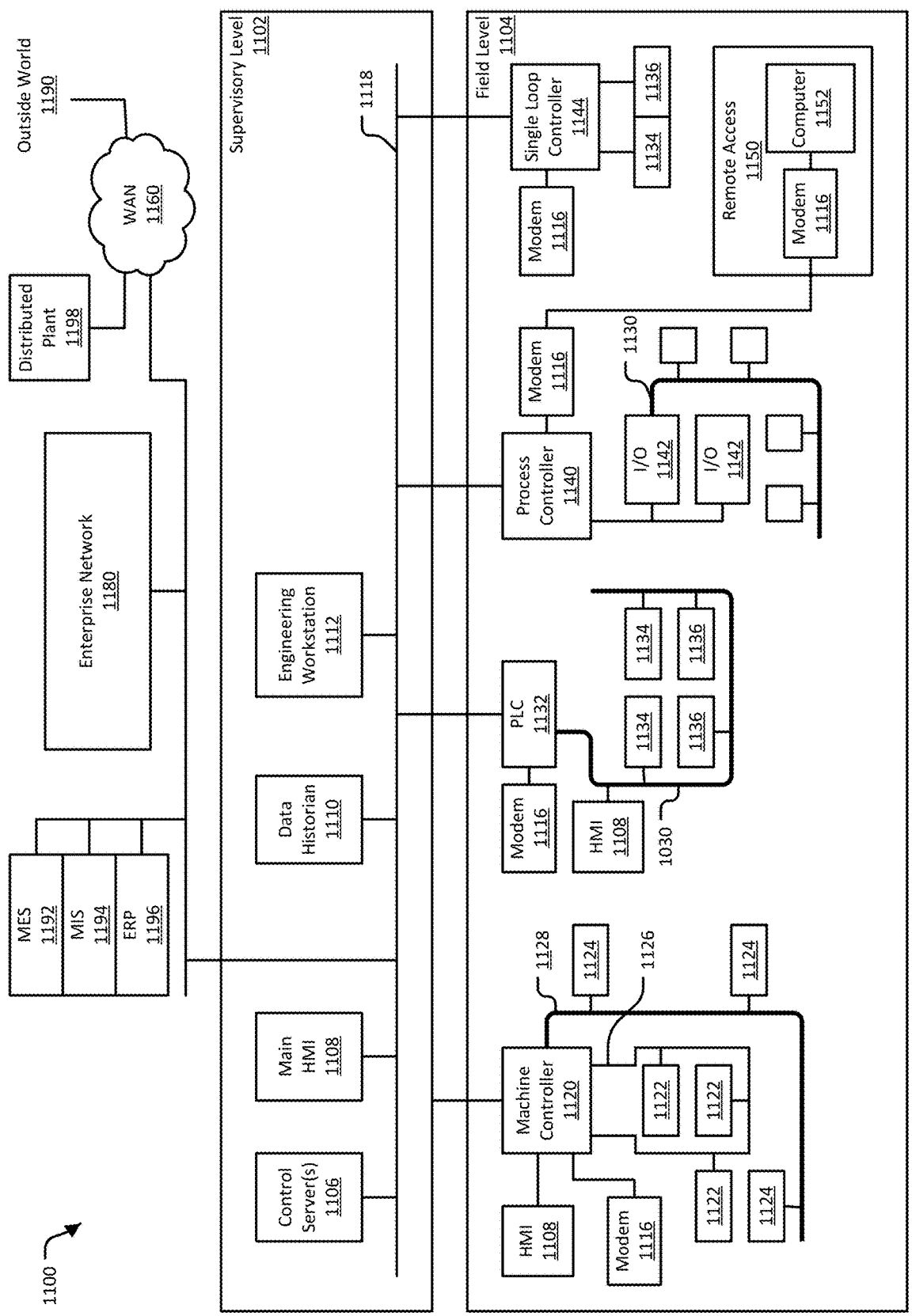
FIG. 11 illustrates an example of a distributed control.

FIG. 11 illustrates an example of a distributed control system 1100. This example distributed control system 1100 encompasses a production facility, including bottom-level production processes at a field level 1104, supervisory control systems at a supervisory level 1102, and a corporate or enterprise layer.

At the supervisory level 1102, a control server 1106, operating as a supervisory controller, may communicate with subordinate systems via a control network 1118. The control server 1106 may send set points to distributed field controllers, and may request data from the distributed field controllers. The supervisory level 1102 may include multiple control servers 1106, with one acting as the primary control server and the rest acting as redundant, back-up control servers. The supervisory level 1102 may also include a main human-machine interface 1108 for use by operators and engineers, a data historian 1110 for logging process information from the system 1100, and engineering workstations 1112.

At the field level 1104, the system 1100 may include various distributed field controllers. In the illustrated example, the distributed control system 1100 includes a machine controller 1120, a PLC 1132, a process controller 1140, and a single loop controller 1144. The distributed field controllers may each control local process actuators, based on control server 1106 commands and sensor feedback from local process sensors.

In this example, the machine controller 1120 drives a motion control network 1126. Using the motion control network 1126, the machine controller 1120 may control a number of servo drives 1122, which may each drive a motor. The machine controller 1120 may also drive a logic control bus 1128 to communicate with various devices 1124. For example, the machine controller 1120 may use the logic control bus 1128 to communicate with pressure sensors, pressure regulators, and/or solenoid valves, among other devices. One or more of the devices 1124 may be an intelligent electronic device. A human-machine interface 1108 may be attached to the machine controller 1120 to provide an operator with local status information about the processes under control of the machine controller 1120, and/or local control of the machine controller 1120. A modem 1116 may also be attached to the machine controller 1120 to provide remote access to the machine controller 1120.

The PLC 1132 in this example system 1100 uses a fieldbus 1130 to communicate with actuators 1134 and sensors 1136 under its control. These actuators 1134 and sensors 1136 may include, for example, direct current (DC) servo drives, alternating current (AC) servo drives, light towers, photo eyes, and/or proximity sensors, among others. A human-machine interface 1108 may also be attached to the fieldbus 1130 to provide operators with local status and control for the PLC 1132. A modem 1116 may also be attached to the PLC 1132 to provide remote access to the PLC 1132.

The process controller 1140 in this example system 1100 also uses a fieldbus 1130 to communicate with actuators and sensors under its control, one or more of which may be intelligent electronic devices. The process controller 1140 may communicate with its fieldbus 1130 through an input/output (I/O) server 1142. An I/O server is a control component typically responsible for collecting, buffering, and/or providing access to process information from control subcomponents. An I/O server may be used for interfacing with third-party control components. Actuators and sensors under control of the process controller 1140 may include, for example, pressure regulators, pressure sensors, temperature sensors, servo valves, and/or solenoid valves, among others. The process controller 1140 may be connected to a modem 1116 so that a remote access 1150 site may access the process controller 1140. The remote access 1150 site may include a computer 1152 for use by an operator to monitor and control the process controller 1140. The computer 1152 may be connected to a local modem 1116 for dialing in to the modem 1116 connected to the process controller 1140.

The illustrated example system 1100 also includes a single loop controller 1144. In this example, the single loop controller 1144 interfaces with actuators 1134 and sensors 1136 with point-to-point connections, instead of a fieldbus. Point-to-point connections require a dedicated connection for each actuator 1134 and each sensor 1136. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1144 in this example is also connected to a modem 1116, for remote access to the single loop controller.

In addition to the supervisory level 1102 and field level 1104 control loops, the distributed control system 1100 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1180 may connect to the example production facility. The enterprise network 1180 may be, for example, located at a corporate office co-located with the facility, and connected to the control network 1118 in the supervisory level 1102. The enterprise network 1180 may provide engineers and managers with control and visibility into the facility. The enterprise network 1180 may further include Manufacturing Execution Systems (MES) 1192, control systems for managing and monitoring work-in-process on a factory floor. An MES can track manufacturing information in real time, receiving up-to-the-minute data from robots, machine monitors and employees. The enterprise network 1180 may also include Management Information Systems (MIS) 1194, software and hardware applications that implement, for example, decision support systems, resource and people management applications, project management, and database retrieval applications, as well as basic business functions such as order entry and accounting. The enterprise network 1180 may further include Enterprise Resource Planning (ERP) systems 1196, business process management software that allows an organization to use a system of integrated applications to manage the business and automate many back office functions related to technology, services, and human resources.

The enterprise network 1180 may further be connected to a WAN 1160. Through the WAN 1160, the enterprise network 1180 may connect to a distributed plant 1198, which may include control loops and supervisory functions similar to the illustrated facility, but which may be at a different geographic location. The WAN 1160 may also connect the enterprise network to the outside world 1190, that is, to the Internet and/or various private and public networks. In some cases, the WAN 1160 may itself include the Internet, so that the enterprise network 1180 accesses the distributed plant 1198 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 12:
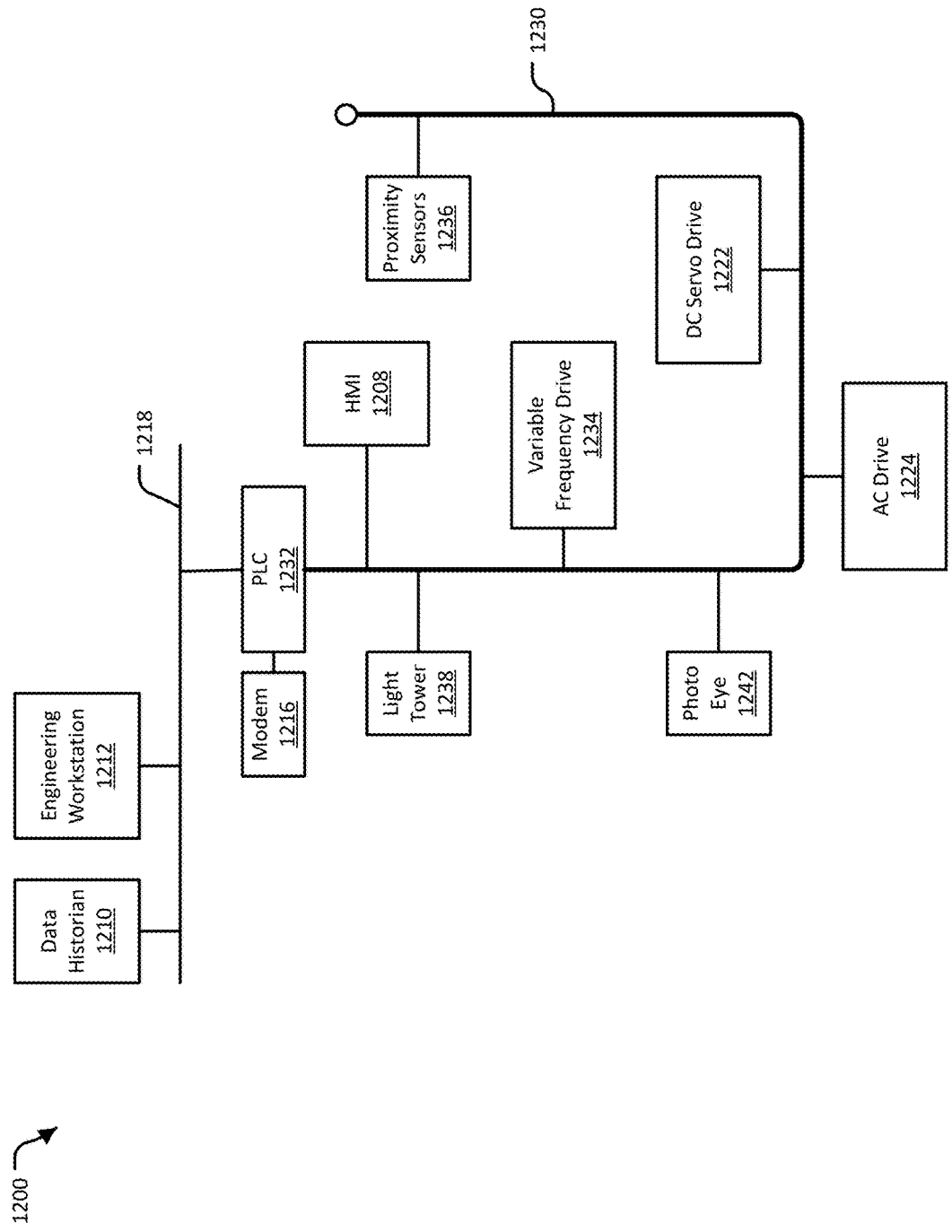
FIG. 12 illustrates an example of a PLC implemented in a manufacturing control process.

FIG. 12 illustrates an example of a PLC 1232 implemented in a manufacturing control process. The PLC 1232 in this example monitors and controls various devices over fieldbus network 1230. The PLC 1232 may be connected to a LAN 1218. An engineering workstation 1212 may also be connected to the LAN 1218, and may include a programming interface that provides access to the PLC 1232. A data historian 1210 on the LAN 1218 may store data produced by the PLC 1232.

The PLC 1232 in this example may control a number of devices attached to its fieldbus network 1230. These devices may include actuators, such as a DC servo drive 1222, an AC drive 1224, a variable frequency drive 1234, and/or a light tower 1238. The PLC 1232 may also monitor sensors connected to the fieldbus network 1230, such as proximity sensors 1236, and/or a photo eye 1242. A human-machine interface 1208 may also be connected to the fieldbus network 1230, and may provide local monitoring and control of the Programmable Logic Controller 1232.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as TCP/IP to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers—simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

Microservices provide a methodology and architecture for developing software. In a microservices architecture, a software application can be structured as a collection of loosely coupled services, where a service is a discrete unit of functionality that can be accessed remotely, and can be acted upon and updated independently of other services. Services are self-contained, meaning that a service may not require another service in order to perform a designated function. Services are often "black-boxes," meaning that the inputs and the outputs of a service is well-defined, but the internal operation of the service is hidden. Services can communicate with one another using well-defined communication protocols.

A microservice is a fine-grained service (e.g., the functionality provided is relatively simple) that uses a well-understood, simple, and generic communication protocol. A microservices architecture enables software developers to decompose large applications into small components (e.g., microservices). This modularization can make the application easier to understand, develop, test, deploy, update, and maintain, since each individual microservice can be modified independently of any other.

Containerization is one technology that enables microservices. Containerization, which can also be referred to as operating system-level virtualization, enables an operating system to maintain multiple isolated user space instances (which can be referred to as containers), each of which are independent from one another and are self-contained. A container can be a light-weight, standalone, executable package that contains a piece of software and everything needed to run the software, including program code, system tools, system libraries, and settings, among other things. Unlike a virtual machine, a container is not tied the hardware of the computer on which the container is run, and can run on any computer that includes an operating system that supports containerization or that includes a software layer for containerization. An example of a software layer for containerization is a program called Docker.

A set of containerized applications can be run on a compute cluster, with individual computing systems in the clusters executing different containers that may be operating in a coordinated fashion. To manage the containers, the computer cluster can include a container orchestration service, which can start and stop containers, distribute and/or move containers across the cluster to distribute the workload, and manage communications between the containers. An example of a container orchestration service is the system called Kubernetes.

Container orchestration services such as Kubernetes are frequently use to manage microservices, such as containerized Docker applications, in a clustered environment. by providing a resource scheduler, container orchestration services provide a platform for managing the life cycle of containers and services contained in the containers.

The popularity of container orchestration services have also made such services a target for attackers looking to exfiltrate data stored in the cluster or in cloud-based resources accessible from the cluster. For example, in one incident an administrative console for a container orchestration service was infiltrated by attackers, due to the console lacking password protection. Once the attackers gained access to the console, the attacker were able to find credentials to a cloud service environment used by the enterprise organization, on which was stored sensitive data. The attackers were also able to download and run crypto currency mining malware, and by minimizing processor utilization were able to avoid detection for some time. Attacks such as ones described by this example, were an attacker is unfamiliar with the resource the attacker has gained access to, are situations where deception technology can be used to detect and thwart the attacks.

Many network security techniques focus on either building stronger perimeter defenses or by using behavioral analysis methodologies to identify malicious attack patterns. Attacks, however, continue to become more sophisticated, such that these techniques can be ineffective in preventing intrusions. Additionally, once an organization has been breached, these techniques can be ineffective in detecting the presence of an intruder. For example, in some past incidents, it has taken over 1100 days to detect a breach.

Deception technology attempts to reduce the amount of time an attacker is present in an organization before detection. As an example, deception technology can detect lateral movement of an attacker from one system within the organization, as well as exfiltration attempts. while perimeter security approaches can be analogous to placing stronger locks on doors, deception technology can be analogized to using motion detectors to spot unexpected movement.

Deception technology can be difficult to scale, however. Prior deception techniques imposed a heavy burden on an organization, requiring hardware to be installed in the organization's network and/or occupying network resources of the network. Deception techniques discussed herein are less intrusive to an organization, and can pose a much smaller, if not insignificant, burden. Additionally, deception techniques discussed herein enable the deployment of deceptions in containerized environments.

Figure 13:
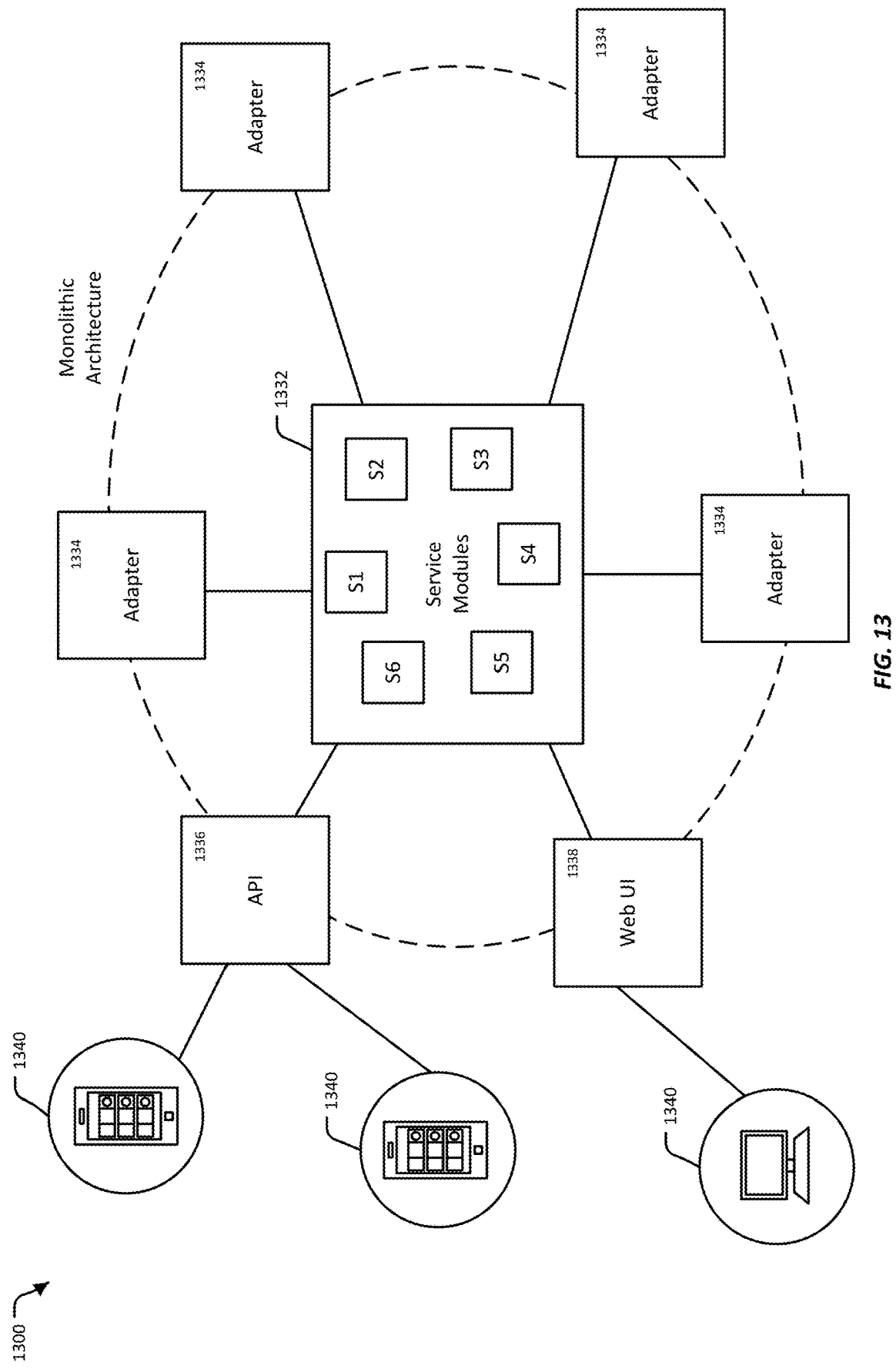
FIG. 13 illustrates an example computing environment with a monolithic architecture.

FIG. 13 illustrates an example computing environment with a monolithic architecture. The monolithic architecture includes, for example, a set of service modules (S1-S6) 1332. The set of service modules 1332 may include multiple modules that define services that make up a larger application or system of applications. Because they are deployed in a monolithic architecture, the set of service modules 1332 may be cross-dependent upon one another. For example, the service modules may be dependent upon the same application programming interface (API) 1336, web user interface (UI) 1338, or other adapters 1334 that allow the services to reach the external world, such as user computing devices 1340. Examples of adapters may include database access components, messaging components that produce and consume messages, and web components that either expose APIs or implement a UI. In other words, the application may include tight coupling between the web layer and the data layer of the application.

While applications written in a monolithic architecture are common, relatively simple to develop, and simple to test, they pose various problems, such as when the size of the application grows. Monolithic applications can be difficult to scale since resources used by different service modules may conflict. In another example, since the service modules are cross-dependent, one error or bug in one module may cause an error or bug across the entire set of services. In such circumstances, a microservices architecture may be more beneficial.

Figure 14A:
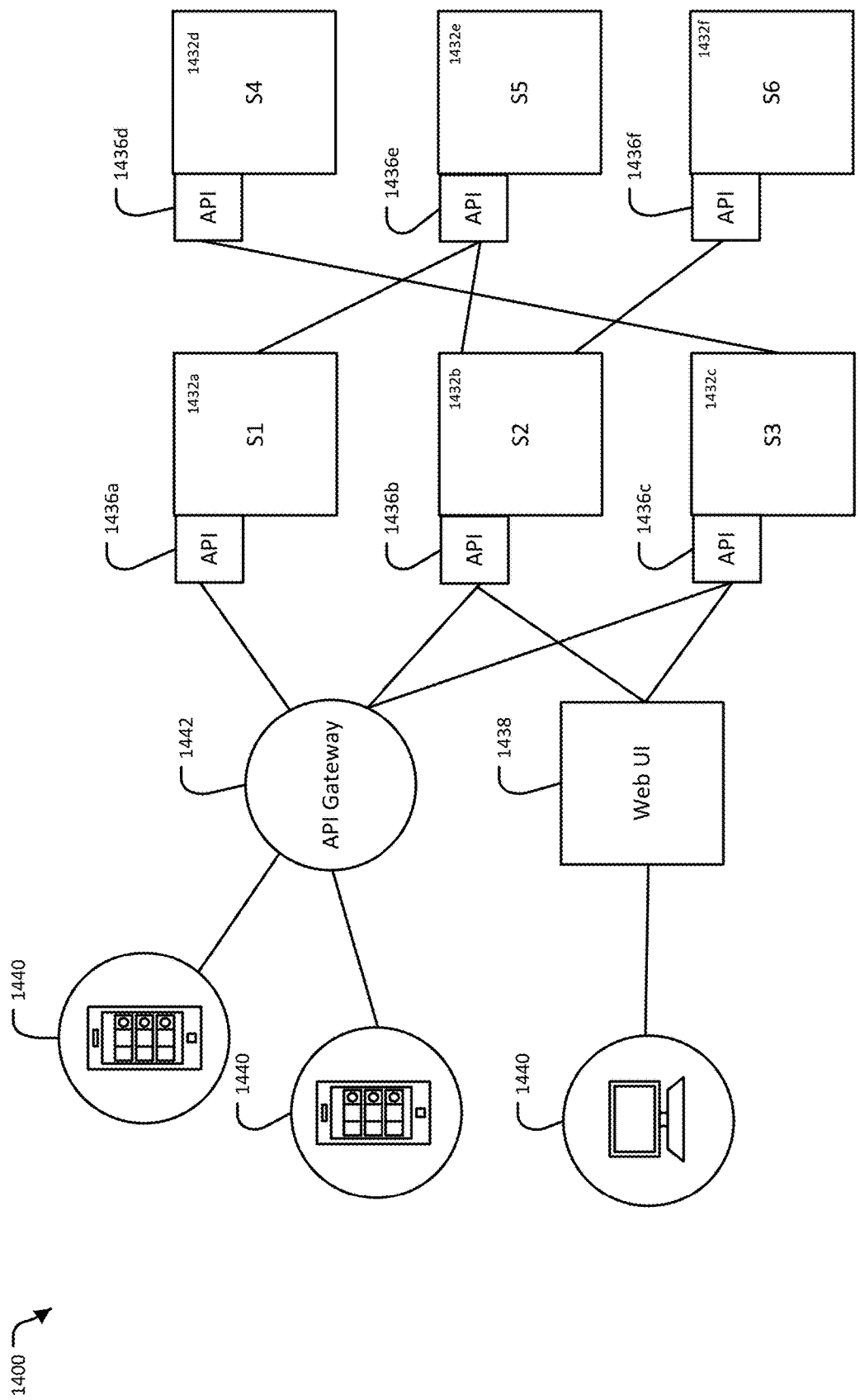
FIGS. 14A and 14B illustrate a computing environment 1400 with a microservices or containerized architecture, according to embodiments of the present technology.
Figure 14B:
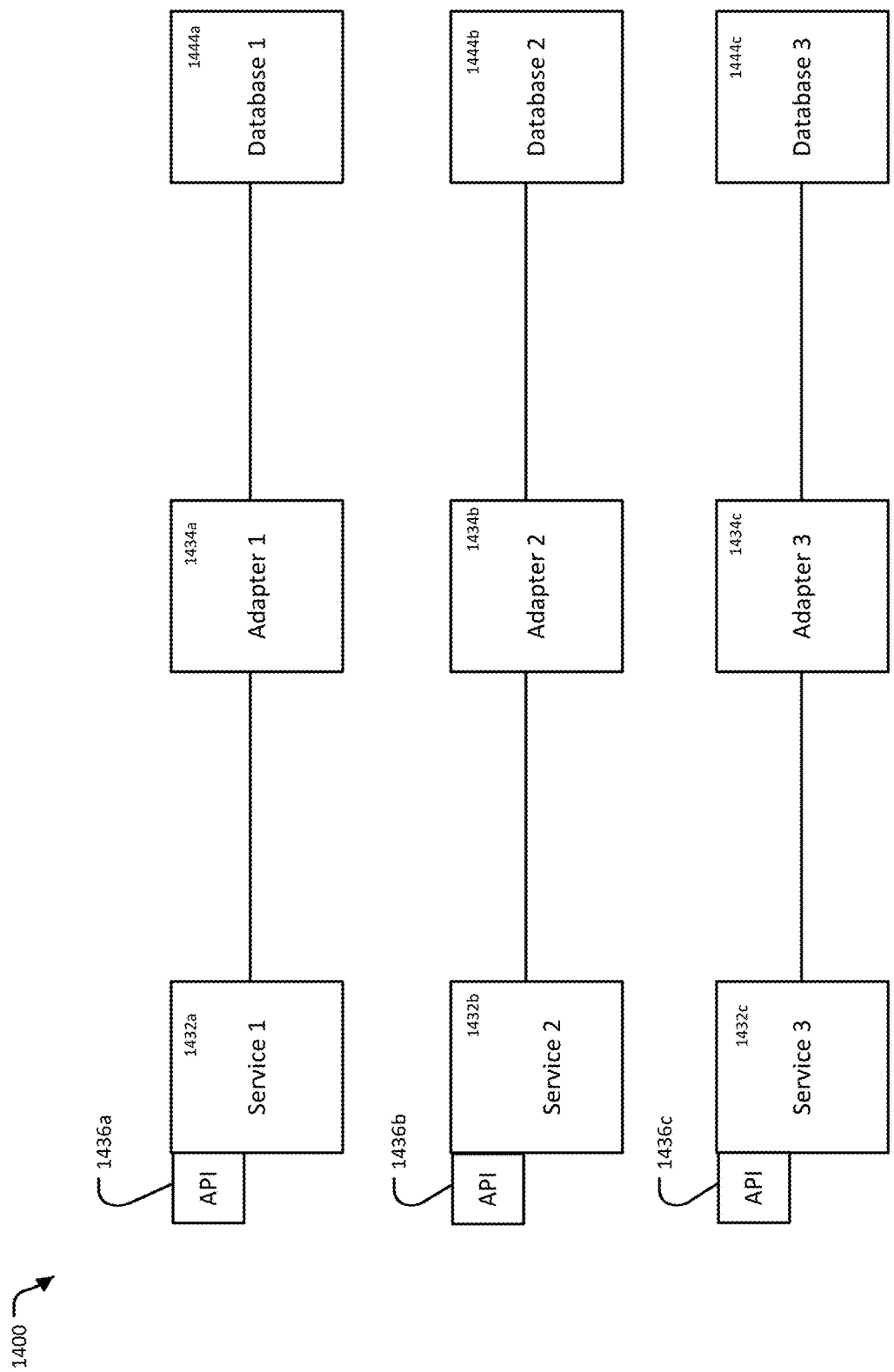

FIGS. 14A and 14B illustrate a computing environment 1400 with a microservices or containerized architecture, according to embodiments of the present technology. As compared to a monolithic architecture, a single application may be broken down into a set of smaller, interconnected microservices, each of which are independent of one another. One example containerized orchestration system that may be used to organize such a set of microservices is Kubernetes. However, even though certain embodiments of the present technology may be described herein as being within a Kubernetes system, other types of containerized environments using microservices may be similarly used within the scope of the present technology.

As shown in FIG. 14A, each service module (S1-S6) 1432a-f are separated from each other and each service implements a distinct set of features or functionality. For example, each microservice 1432a-f exposes a REST API 1436a-f. The different microservices in the microservices architecture may communicate with one another by making a DNS call within the system. While the services are interconnected, i.e. can communicate with one another, they are not dependent upon one another. Each functional area of the application may include its own individual microservice. Therefore, if one of the services fails, that failure does not impact the other services in the system, or cause the entire system to fail. The use of a microservices architecture as opposed to a monolithic architecture also may also impact the relationship between the application and the database(s) that store its data. For example, as shown in FIG. 14B, each microservice 1432a-c has its own respective database 1444a-c instead of only sharing a single database with the entire cluster of services. As such, each database 1444a-c may be the same type of database, or may each be a different type of database. The microservice, including the needs of that microservice, may determine the type of database selected for each of databases 1444a-c.

Figure 15A:
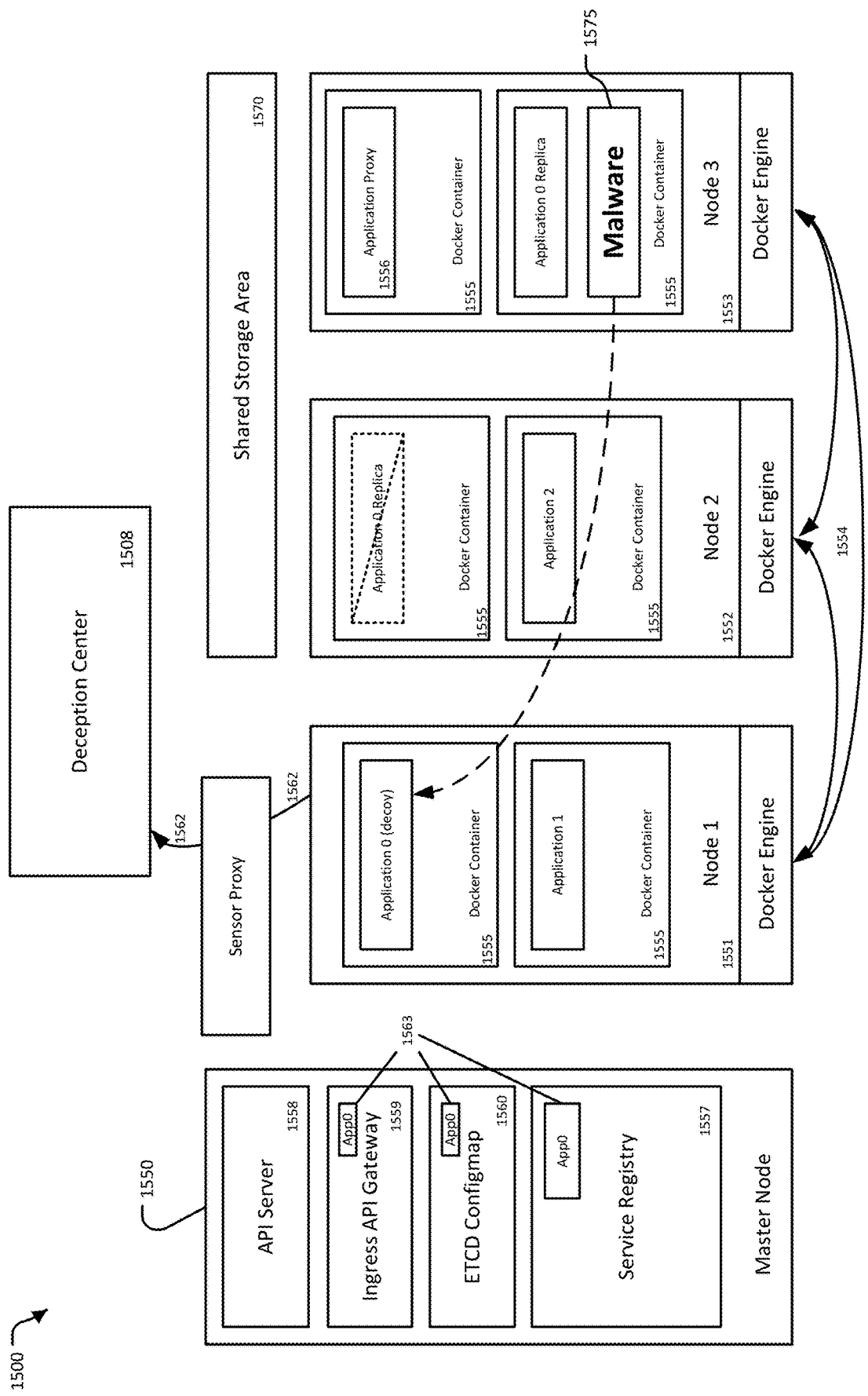
FIGS. 15A and 15B illustrate an example deception system 1500 implemented in a containerized environment using a microservices architecture, according to embodiments of the present technology.
Figure 15B:
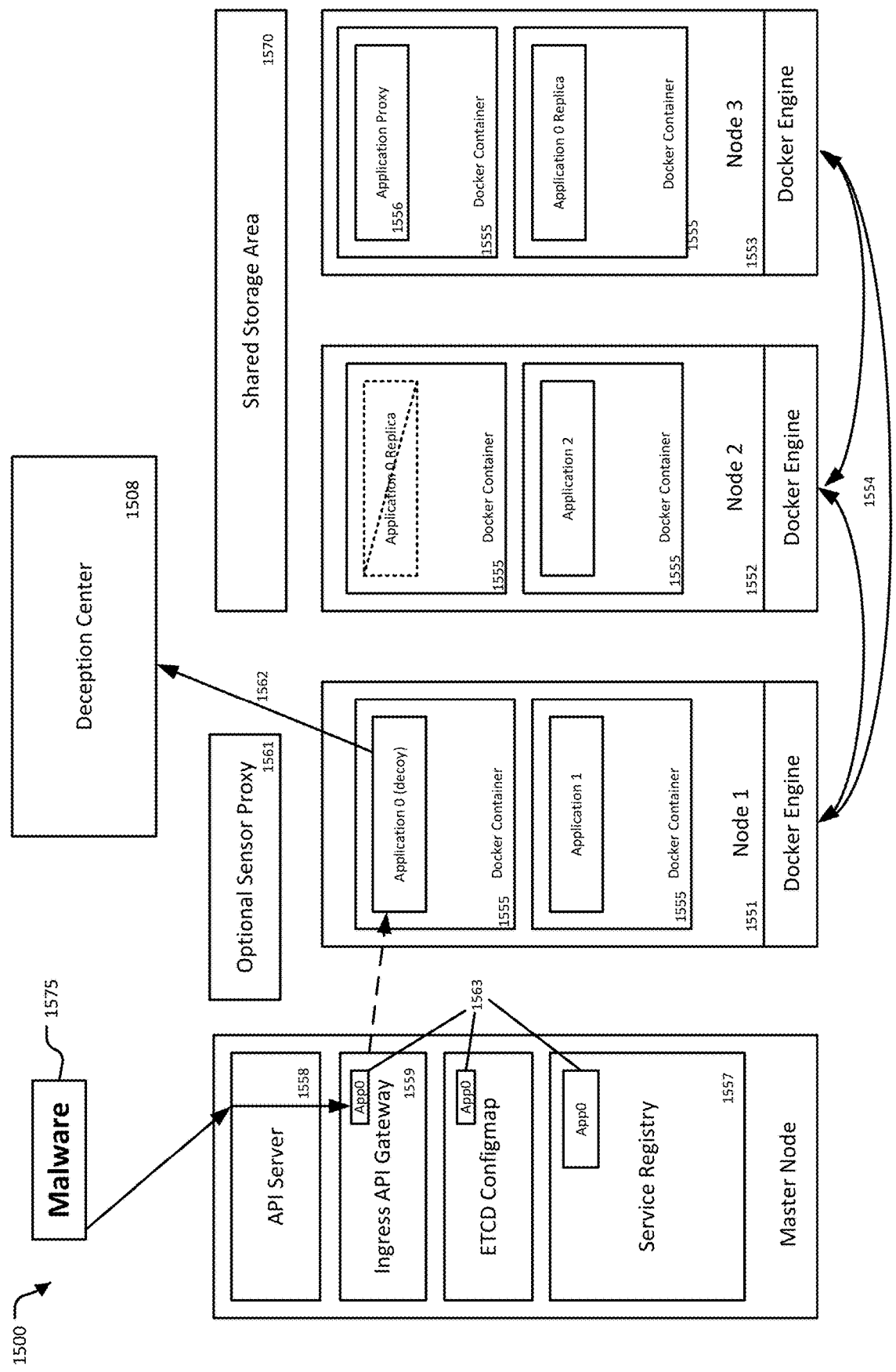

As noted herein, containerization is one technology that enables microservices. FIGS. 15A and 15B illustrate an example deception system 1500 implemented in a containerized environment using a microservices architecture, according to embodiments of the present technology. The deception system includes one or more entities or nodes, including a master node 1550 and other nodes 1551-1553. The nodes may all communicate with one another, such as via communication paths 1554. Even though no communication path is shown in FIG. 15 from the master node 1550 to the other nodes 1551-1553, master node 1550 may communicate with each of nodes 1551-1553 and each of nodes 1551-1553 may communicate with master node 1550. Each node may include one or more containers, such as docker containers 1555. However, other types of containers may be used in other example containerized systems according to embodiments of the present technology. Docker containers 1555 may each include one or more individual applications. For example, different docker containers 1555 may include application 0, application 1, application 2, etc. as shown in FIG. 15.

The containers may also include replicas of one or more of the applications. For example, while application 0 may be located in a docker container 1555 in node 1, a replica of application 0 may also be located in a docker container in node 2. Replicas may be identical or nearly identical to the original version of the application. For example, a replica of an application may be the same as the application (e.g., include the same code) but may just have a different IP address than the original. One, two, three, or more replicas of an application may be present within the containerized environment. The number of replicas included in a particular environment may be dependent upon how much data associated with the application needs to be written to or stored in the environment. The load may be strategically distributed across the application and one or more replicas to load balance, as described further below.

One benefit of a containerized environment such as the containerized environment shown in FIGS. 15A and 15B is "scale out." A scale out means that the different nodes of the environment may share the load of the environment and load balance between all of the existing microservice replicas/copies. For example, if application 0 is located in node 1 and a replica of application 0 is located in node 2, the different replicas of the same application may share the load when data is written to the databases associated with application 0. Furthermore, additional replicas may be generated if more replicas are needed to spread the load to more nodes within the system.

Another benefit of a containerized environment such as the containerized environment shown in FIGS. 15A and 15B is "service indirection." Service indirection means, for example, that when an application within a node in the environment wants to communicate with another application in the environment, the application will not communicate directly and immediately with the other application. Instead, the application will communicate with the other application using a "middle man" or a central application that coordinates such communications. For example, if application 1 in node 1 wants to communicate with application 2 in node 2, then application 1 may send a request to service registry 1557 (e.g., kube-dns in Kubernetes) for the IP address of application 2. However, service registry 1557 may not return the IP address of application 2 back to application 1. Instead, service registry 1557 may return the IP address for a different, middle man or proxy application such as application proxy 1556. Application proxy 1556 may be located in a different docker container 1555, such as one in node 3 as shown in FIGS. 15A and 15B. Therefore, when application 1 calls the application proxy 1556 and asks the proxy to write data to a database (associated with application 2), application proxy 1556 (or the docker container 1555 where it is located) may act as a middle man application so that application 1 and application 2 are separated from each other, and not inter-dependent upon each other. Application proxy 1556 may load balance the system by deciding whether the data should be written to application 2 in node 2 or another replica of application 2.

Using an application proxy such as application proxy 1556 in this way may allow for fault tolerance. For example, if application 2 were to crash or otherwise fail, application proxy 1556 may send the request received from application 1 to a replica of application 2 instead of to application 2 itself. If a replica needs to be generated, generation of a replica to host the request may be initiated. Therefore, if application 2 fails, the request will still be fulfilled by another application, and the failure will not cause other applications or requests to fail. In addition to service indirection, fault tolerance in system 1500 may also be prevented due to shared storage area 1570. Shared storage area 1570 may include a copy of all data across the system so that if an application or database fails, shared storage area 1570 may be used to refresh any lost data by application proxy 1556 or other applications in the environment. Each of these fault tolerant solutions that may be implemented in a containerized environment may also help prevent damage from an intruder. For example, if malware is located internal or external to the system, the malware may not have direct access to a container, but instead may be routed through an application proxy, such as proxy 1556. However, if malware is able to intrude past the indirection and gain access directly to a docker container, the malware may put the system at risk.

Although the different applications within the system 1500 are shown to be located in a specific set of nodes in a specific way, that layout is for example purposes only and any other organization of the applications, containers, and nodes are possible within embodiments of the present technology.

As described herein, deception systems according to embodiments of the present technology are aimed at preventing an attacker or intruder in a containerized environment. An attacker may breach a containerized environment in a variety of different ways. In one example, an attacker may breach a master node (e.g., Kubernetes administrative console) such as master node 1550 via API server 1558, ingress API gateway 1559, or otherwise. For example, the attacker may gain access via the API server using one or more stolen tokens. The master node may be located within the containerized environment, i.e. in the same location as nodes 1-3, or at a public cloud services provider. The attacker may have found the master node by brute force; that is, by profiling domains or IP addresses on the system's network or at the cloud services provider and attempting to log in using credentials to discover any that are not secured. In a Kubernetes environment, having gained access to the administrative console, the attacker gains access to the Kubernetes Domain Name System (DNS), configuration register, and ingress database. Each of these three components of Kubernetes are visible once the attacker gains access to the administrative console. A next phase of the attack may include identifying containers using the DNS, which stores a network address for each container, locating crucial information in the configuration register (such as user identifiers and/or passwords), and/or identifying ingest points of the containers from uniform resource locations (URLs) stored in the ingress database.

In another example, an attacker may intrude directly through a node of the system, such as through one or more of the applications hosted by the node. For example, the attacker may look for holes in an application through which the attacker may be able to insert malware (e.g., malware 1575) into the container. The malware may then be able to search through the environment, monitor or attempt to obtain data from databases in the environment, or otherwise interact with one or more of the applications in containers in the containerized environment. Through this method or others described above, the attacker may also use a docker engine application running on each node, which hosts the containers on each node, to implement the malware on the container associated with that docker engine. Such malware may be running either internally within the system, or may be running external to the system from an external source to one of the ports within the system.

In order to prevent sustained presence in the system by an attacker, the system may be able to detect the presence of the attacker and thwart the attack using one or more decoys. A decoy may be, for example, an application that resembles or includes characteristics similar to other applications already a part of the containerized environment. Furthermore, the structure of the environment in which the decoy sits may also be the same as or similar to the environment in which other applications in the environment sit. For example, application 0 in system 1500 is a decoy application. Decoy application 0 is located within a docker container 1555, which is hosted by a node (node 1), in the containerized environment, similar to other applications in the environment.

A decoy may be integrated into the system, and may blend in to the environment because it has similar characteristics to other applications in the environment, but since the decoy is not a "normal" part of the system, the decoy is not routinely, or ever, part of an interaction with legitimate or genuine users of the system. Similarly, the decoy is not routinely, or ever, part of an interaction with other, legitimate or genuine applications on the system. For example, due to the containerized environment in which the decoy and the other applications on the system sit, the decoy is containerized and separated from other applications on the system. Therefore, the only reason that a decoy would be engaged in activity (e.g., communications, requests) with another application or a user is if the other application (e.g., malware) or user is part of an intrusion into the system. Therefore, if a decoy has an interaction, it may be assumed that an intrusion took place or is currently taking place.

To determine which type of decoy should be implemented into the system, a discovery or monitoring step may be performed. In various examples, the discovery step includes determining the services that are being executed in a containerized environment. In various examples, the deception platform can identify namespaces, pods, and services running within the containerized environment, for example by accessing, through an administrative console, the DNS, configuration/service registry, API server, and/or ingress database/gateway, among other components. In this and other examples, the deception platform can build a profile of the environment, including the services being executed, names uses, network addresses used, and so on.

To determine which type of decoy should be used, or to determine characteristics of the decoy before generating the decoy, machine learning or other data analytics may be used. For example, the discovery or monitoring may be performed by deception center 1508 or by another entity inside or outside of the containerized environment, and may monitor multiple intrusions over a period of time. Alternatively, an external network or server such as a cloud network or server may collect data associated with such monitoring across multiple different containerized environments so that more effective decisions may be made regarding the types or characteristics of a decoy. For example, certain characteristics of decoys may be determined to be more successful at luring or being attractive to an intruder, and analyzing data across multiple containerized environments over time may help determine that. In other words, more objective data may be used to determine which decoy should be used for a particular environment, in addition to specific information or characteristics associated with the specific environment in which the decoy will be deployed.

In various examples, the deception center or other portion of the system can use the profile of the environment and a data science-based recommendation system to determine which decoy, including specific characteristics of the decoy, would be most effective for the particular environment at issue. In various examples, the decoys can include decoy workloads in existing namespaces. Alternatively or additionally, the decoys can include complete decoy namespaces. In various examples, the cluster's operator can customize the decoy deployment. In various examples, the decoys include a tiered stack, including, for example, a front end, message bus, database, and/or backend tier service, among other features. In this and other examples, the decoys do not conflict or overlap with existing production workloads.

In various examples, once configured, decoys can be deployed by launching the decoys using similar steps for launching production workloads. In various examples, the operator of the containerized environment can view a recommended deception deployment using a console, and/or adjust the deployment. For example, the operator can adjust the operating system of the decoys and/or the type of services implemented by the decoys. The operator may also view alerts, e.g., alerts of activity at a decoy, at the console.

In various examples, once the decoy workloads are deployed, the deception platform performs the injection step, including placing decoy data in the containerized environment, where the decoy data refers to the decoy or decoy workloads.

A decoy may be implemented into an already-existing system with already-existing containers and applications that are a part of an existing network. In order to insert a decoy into such an environment, the decoy may perform certain steps. First, the decoy may register itself as a service on a TCP port within the system. Second, a pod or shell container may be generated within a node of the system.

Then, third, the decoy application may monitor or listen on the registered port for activity or requests coming from a requestor, such as an attacker or intruder.

After one or more decoys have been deployed, the decoy may sit on the system and wait for interactions. However, since a containerized system may include many different applications spread across many different containers in many different nodes, an intruder may not necessarily engage with the decoy on its own. Therefore, one or more breadcrumbs (e.g., breadcrumbs 1563) can be placed in the environment to entice an intruder to engage with a decoy. For example, breadcrumbs may be placed on one or more of the DNS, configuration registry, ingress database, ingress API gateway, API server, and/or ETCD configmap, etc. The breadcrumb(s), which can be referred to as lures or decoy data, can be configured to appear attractive to an attacker while at the same time blending in with legitimate data stored in the Kubernetes components. Using the breadcrumbs, the attacker may try to access a decoy service container/pod. The decoy service pod can, at least from an external perspective, appear to be containing a well-known microservice, such as nginx, MongoDB, or another microservice, so that the decoy service pod appears both authentic and attractive to the attacker.

Breadcrumbs may be placed in the service registry 1557, as shown in FIGS. 15A and 15B. This breadcrumb may indicate to an intruder that the decoy is present in a container, but not that the decoy is a decoy. In other words, the reference in the service registry 1557 to the decoy may indicate just that the decoy is an application that exists and that it is registered, with possible other information about the decoy, such as its current location in the environment. Breadcrumbs may also be placed in the configmap 1560. In embodiments of the present technology, configmap 1560 is where the system or users of the system may store configurations associated with the system. Therefore, configmap 1560 may have information associated with the different applications in the containerized environment, including the decoy. Breadcrumbs may also be placed in the API gateway 1559. This breadcrumb may include information about the location of the decoy, such as the node and/or container that the decoy is located in (although, again, the intruder would just see that the decoy is an application, and not that the decoy is a decoy). Breadcrumbs may also be strategically placed in other portions of the containerized environment.

As described herein, a decoy may be, for example, an application that resembles or includes characteristics similar to other applications already a part of the containerized environment. Similarly, breadcrumbs may be developed to include characteristics of other data present in the system that is associated with genuine applications. Breadcrumbs may include data in the different portions of the containerized environment that resembles and is stored with similar information associated with genuine applications. For example, if API gateway 1559 includes a reference to application 2 in docker container 1555 of node 1552 or other data associated with that application, API gateway 1559 may also include a breadcrumb reference to the decoy application(s) or other data associated with the decoy application(s). Other types of data in different portions of the containerized environment may also be associated with the decoys as decoy breadcrumb data, and those types of data may also have counterparts associated with the other applications in the system and be present in the same location within the containerized environment. If the environment includes breadcrumb or other data associated with the decoy in a way that is similar to other, genuine applications on the system, an intruder will be less likely to determine that a decoy application is, in fact, a decoy. The goal of a decoy and the deception center 1508 that may deploy the decoy is for the decoy and breadcrumbs associated with the decoy to blend in with the rest of the system and applications therein. If an intruder is less likely to determine that a decoy is a decoy, then the intruder is more likely to engage with the decoy, which would allow the system to prevent the intrusion or further intrusion by the intruder, as described herein.

As noted herein, To determine which type of decoy should be used, or to determine characteristics of the decoy before generating the decoy, machine learning or other data analytics may be used. Similar machine learning or analytics may also be used to determine which breadcrumbs may be generated and deployed into a containerized environment. For example, machine learning tactics may be used to collect and analyze data across a containerized environment or across multiple (independent or related) containerized environments (or other environments) to determine which types of breadcrumbs are most effective at luring intruders to find and engage with a decoy. These tactics may be used to determine specific characteristics of breadcrumbs that may be more or most useful.

Once an attacker attempts to interact with a decoy, however, the decoy service pod can capture the attackers inputs, and can report these inputs to a the network's security infrastructure. For example, the interaction can be provided to deception center 1508 (e.g., a Security Information and Event Management (SIEM) system) for analysis. Deception center 1508 may be similar to other deception centers described herein, such as deception center 108. Interactions with the decoy may be captured by the decoy and forwarded to the deception center 1508 via communication path (e.g., tunnel) 1562. Use of deceptions in this fashion can reduce the amount of time an attacker is present in the network before detection. In some examples, the deception center can be on site with the cluster or in network that is remote (e.g., accessible over various intervening networks) from the cluster. As described herein, the deception center can host many deceptions, including entire deception networks, and can include attack projection and analysis systems.

In various examples, breadcrumbs can also be placed in the cluster that encourages an attacker to attempt lateral movement to a cloud service that is accessible from the cluster. For example, a breadcrumb may include a decoy reference in the configuration database to a Google Cloud Storage instance. The cloud storage instance can be an actual instance in the Google Cloud, to maintain authenticity, but can include data that appears valuable but is only a decoy. The authentic appearance of the data, however, can encourage an attacker to attempt to exfiltrate the data. This interaction can be captured by the cloud storage instance, and also be reported to the network security infrastructure.

An example type of breadcrumb 1563 that may be incorporated into the containerized environment is one or more API tokens or other credential information associated with the decoy application. For example, a token or other information may be inserted into the API server 1558, ingress API gateway 1559, or other locations within the system. For example, if the intruder enters the system via the API server 1558 and ingress API gateway 1559, the intruder may stumble upon the token, and then may use the token to access the decoy application even though the intruder may not know that the intruder is being led to the decoy via the breadcrumb.

In various examples, a deception deployment for a containerized environment, such as Kubernetes, can use breadcrumbs that align with the microservices in environment and uses the control plane and the data plane provided by the environment to seamlessly blend with the environment. In these and other examples, an attacker may not easily be able to differentiate between production workloads and deception workloads.

Figure 16:
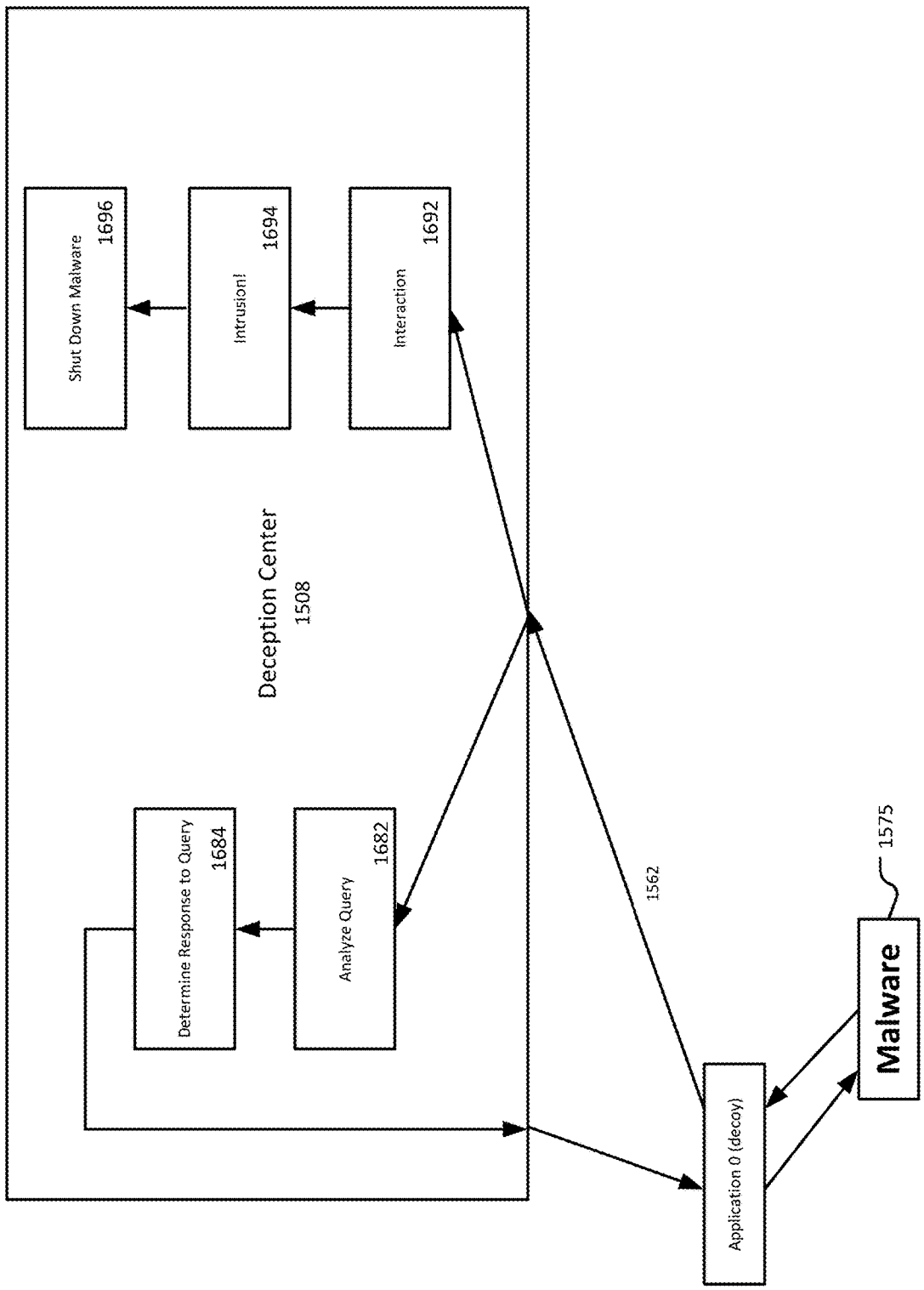
FIG. 16 illustrates a logical flow and block diagram illustrating an example process for detecting an intrusion, according to embodiments of the present technology.

Whether or not breadcrumbs are noticed by the intruder, the intruder, such as malware 1575 may interact with the decoy application 0. For example, malware 1575 may send a request directly to the decoy application. Malware 1575 may know the location or other credentials of the decoy application from breadcrumbs, for example. Alternatively, malware 1575 may request the IP address of the decoy application from service registry 1557. As described herein, service registry 1557 may send the IP address back to malware 1575, or may use application proxy 1556 as an in-between/middle man to communicate with malware 1575. If malware 1575 is located external to the containerized environment, such as shown in FIG. 16, malware 1575 may intrude via the API gateway 1559. Again, malware 1575 may gain information to attempt to attack the decoy application using breadcrumbs found in the environment or otherwise. In any scenario, interactions with the decoy application are captured. The decoy workloads can be configured such that, when accessed, the decoy sends an alert to the deception center of the deception platform. In various examples, the deception platform enables an operator of the containerized environment to view alerts from the decoys.

Even though some examples described herein include malware as an example intruder into the containerized environment, other types of intruders are also possible according to embodiments of the present technology. Examples of other types of attacks may include hijack of Kubernetes (or other containerized environment) control center through an unprotected dashboard, privilege escalation attack of containers, malware injection into public container images, and attack through stolen or leaked access tokens.

As noted, interactions with the decoy may be captured by the decoy and forwarded to the deception center 1508 via communication path 1562. However, it may be costly and/or burdensome to generate a tunnel between the deception center 1508 and each decoy or docker container containing a decoy. Therefore, a sensor proxy 1561 may optionally be included in the system 1500. Sensor proxy 1561 may be located within the containerized environment (e.g., in a container in the environment). Sensor proxy 1561 may communicate with each of the decoys, and then communicate with deception center 1508 for any decoy that is trying to communicate with deception center 1508. Sensor 1561 may be implemented as software or a small piece of hardware running an operating system and connected to the system's network.

In various examples, the deception center, alternatively or additionally, can generate breadcrumbs that refers to a deception sensor in system, rather than to a decoy container. The deception sensor can be implemented as software or as a computing device with a minimal amount of hardware that connects over a network to the deception center. Through the deception sensor, the deception center can respond to accesses to the deception sensor, which may appear as attempts to access a containerized service. In various examples, the deception platform can generate multiple sets of breadcrumbs that each appear to refer to different containerized service, and which can all refer to the deception sensor. In these and other examples, the deception sensor can enable multiple decoy containerized services to be added to the containerized environment without starting/generating any actual containers.

Decoy applications may be incorporated into the system as individual applications or as a stack of applications. An example of a tiered stacks for decoys is as follows:
flavors=[
["mysql", "redis", "kafka", "zk", "account-mgr"]
["postgresql", "nats", "customer-mgr"]
["mariadb", "redis", "kafka", "zk", "inventory-mgr"]
["mongodb", "nats", "user-mgr" ]
]

In this example, a lowest-level tier describes a database service (e.g., mysql, postgresql, etc.). The next highest tier describes a database type (e.g., redis) or a messaging service (e.g., vats). The next highest tier describes a communication stream (e.g., kafka). The last tier describes a name of the workload (e.g. account-mgr, customer-mgr, etc.). As illustrated by this example, the decoys can indistinguishable from a production workload. In some examples, the decoys may, for example, execute an actual database or other service, to maintain the illusion of authenticity. In some examples, the decoys may only appear to be running an actual service, but are instead only running code to detect an access.

In various examples, a containerized environment can include additional layers of services that can assist in the operation of the environment. One example of such a service is a traffic flow management service, which can provide a uniform way to connect, manage, and secure microservices. A traffic flow management service can, for example, enforce access policies and aggregate telemetry data, among other operations, without requiring modifications to the code of any of the microservices. A traffic flow management service can also be referred to as a service mesh. An example of a service mesh is a platform called Istio.

Traffic flow management services can provide greater visibility, control, policing, and security to a containerized environment. In various examples, a deception platform can include components that integrate with or sit alongside the traffic management service, for greater control over decoy deployments and decoy data. In various examples, the containerized environment may include a deception plane, which may provide sidecars similar to Istio sidecars, which can sit alongside production workloads. The sidecars in the deception plane, however, do not interfere with the communication between a workload and an Istio sidecar, but rather adapts to the communications between the workload and the Istio sidecar.

As applications and application environments evolve, deception technology can similarly evolve to effectively mimic users and workloads. Integration of deception technology and containerized environments can aid in detection of attacks on cloud-based data and services. The deception techniques discussed above can complement perimeter and behavioral defenses, and reduce the amount of time an attacker is present in a containerized environment. In various examples, the deception techniques discussed above can be used in either or both on-premises situations and cloud-based situations.

FIG. 16 illustrates a logical flow and block diagram illustrating an example process for detecting an intrusion, according to embodiments of the present technology. As noted with respect to FIGS. 15A and 15B, an intruder, such as malware 1575 may interact with the decoy application 0. For example, malware 1575 may send a request directly to the decoy application, or may be routed through a proxy or other portions of the containerized environment. Interactions with the decoy may be captured by the decoy and forwarded to the deception center 1508 via communication path (e.g., tunnel) 1562. After deception center 1508 receives an indication that any entity has engaged with the decoy, such as by receiving captured interactions with the entity and forwarded by the decoy application, deception center 1508 may, either in series or in parallel, perform two separate processes. First, deception center 1508 may assist the decoy application in responding to any requests made by the intruder, such as malware 1575. If malware 1575 sends a request to application 0 as part of the interaction with the decoy, and decoy 1575 does not receive a response to its request, then the intruder may determine that the application is a decoy. It may be more beneficial for deception center 1508 to not cause the intruder to become suspicious so that deception center 1508 or other entities around the system can identify and eliminate the intruder from the system. Therefore, deception center 1508 may analyze the request/query from the intruder at block 1682, and then determine a response to the query at block 1684 before returning the response to the decoy application, which may use that respond to respond directly to the intruder 1575. Since the decoy application is a shell application that may not function by itself like other applications (i.e. without help from other services like deception center 1508), the decoy application may not be capable of responding to the intruder by itself.

Second, deception center 1508 may determine whether the activity at the decoy application indicates that an intruder is present in (or outside of) the system. For example, deception center 1508 may determine that an interaction has taken place at the application at block 1692. This determination may be based on the communication 1562 forwarded to deception center 1508. Thereafter, deception center 1508 may determine that, based on the determined interaction, an intrusion has taken place at block 1694. This determination may be based solely on the fact that an interaction took place with the decoy application, or the at block 1692 may analyze the interaction or data associated with the interaction to make an active determination of an intrusion. For example, the data may indicate the type of request that was made during the interaction, the entity that made the request, etc., which may indicate that the interaction is indicative of an intrusion. Alternatively, the data may indicate that the interaction was with a legitimate user or genuine service of the system and that the interaction was not indicative of an intrusion. For example, analysis of the interaction data may indicate that the interaction was due to a mistake interaction by the legitimate user or genuine service. If an intrusion is determined, then the system may take actions to shut down the intruder at block 1696. Example actions that may be taken include notifying an administrator of the environment/system, send the event to SIEM, use another security software to isolate the suspicious host (e.g., a firewall may stop the north-south traffic to that hosts, software on the switch can block all communication to and from that host, an EDR/EPP agent running on that host can shut the host down, etc.), among others.

Other indications of an intruder, whether determined using interaction data or otherwise, may include, for example, repeated attempts by the activity by a requestor/possible intruder to interact with the decoy application. Such activity may be evidence of a brute force attack. In another example, a requestor may be identified as an intruder if the requestor uses correct credentials to access the decoy service, or in other words if a requestor does not just interact with the decoy application, but actually uses credentials to successfully use the credentials. Using correct credentials may imply that the attacker has stolen the credentials from breadcrumbs placed on other hosts, or from elsewhere. Attempting to upgrade credentials may also indicate an intruder. Upgrading credentials, or "privilege escalation," may be accomplished by, for example, running an exploit. In another example, a requestor attempt to read data from the decoy service, or exfiltrate data, may be evidence that the requestor is an intruder. For example, certain data may be stored in the environment and be associated with the decoy application. This data may include files, a database, logs, etc. Activity may be identified as an exfiltration if the intruder attempts to access that data associated with the decoy application. In another example, the requestor attempting to obtain higher privileges within the system may be evidence that the requestor is an intruder.

The entity that owns or controls the containerized environment/system may also have input in the decision regarding whether particular types of entities that interact with the decoy application are intruders, or malicious. For example, each engagement or data associated with an engagement by a potential intruder with the decoy application may be collected and organized. For example, such interactions or associated data may be mapped to a phase in an ATT&CK chain. After those interactions and/or data are recorded, the entity may define (or have previously defined) what actions are considered malicious and need to be addressed.

Although an intruder may be identified as any entity that interacts with a decoy for any reason, further analysis may be done to determine whether the intruder is malicious. Thereafter, a decision may be made by deception center 1508 (or by another device, such as a cloud device) whether to take action against the intruder or whether to leave the intruder alone, even though the intruder is present in the system without authorization.

Use of deceptions in this fashion can reduce the amount of time an attacker is present in the network before detection. In some examples, the deception center can be on site with the cluster or in network that is remote (e.g., accessible over various intervening networks) from the cluster. As described herein, the deception center can host many deceptions, including entire deception networks, and can include attack projection and analysis systems.

Figure 17:
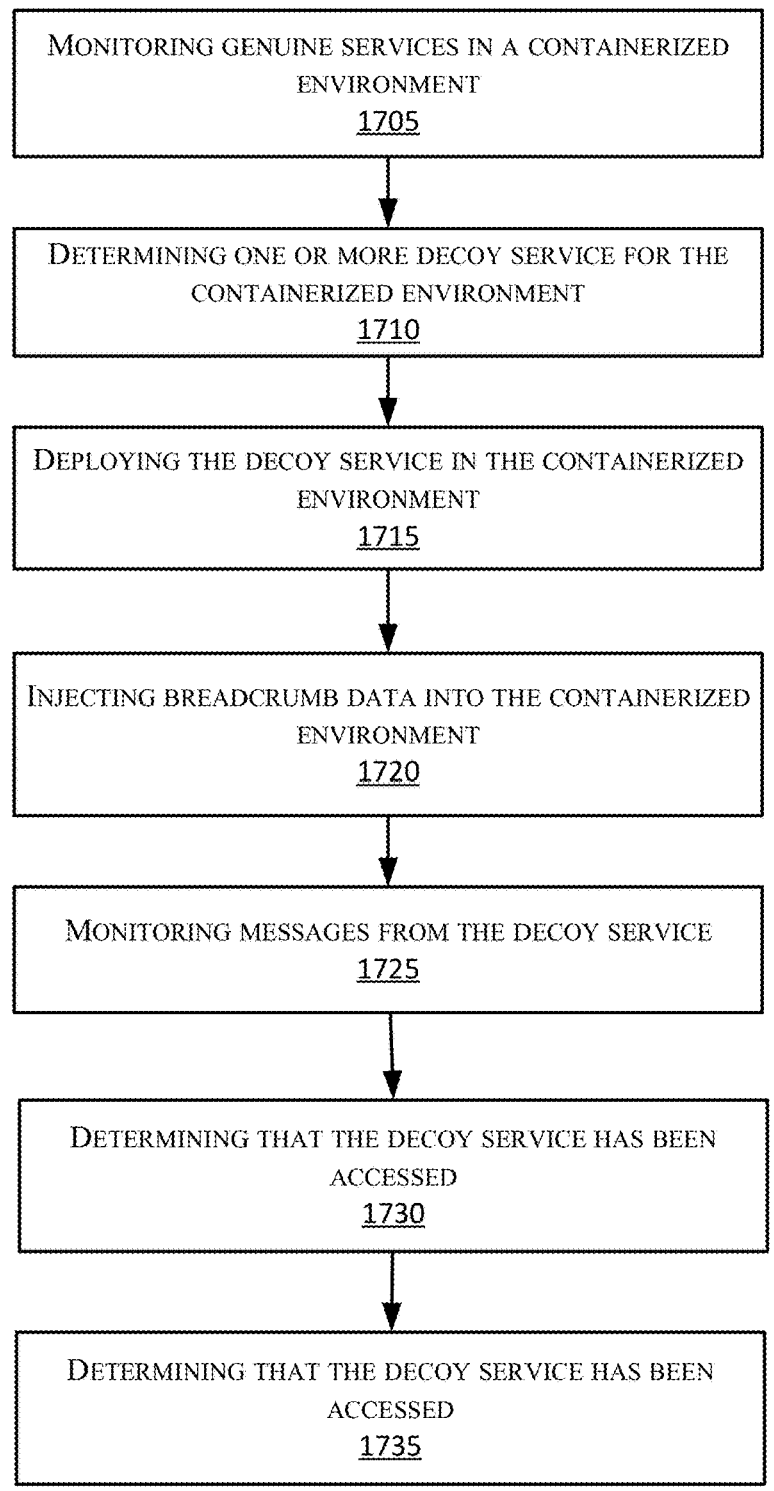
FIG. 17 is a flow diagram of an example process for deception in containerized environments, according to embodiments of the present technology.

FIG. 17 is a flow diagram of an example process for deception in containerized environments, according to embodiments of the present technology. Step 1705 includes, for example, monitoring, by a monitoring service connected to a containerization system in a containerized environment, genuine services in the containerized environment to determine characteristics of the genuine services. Step 1710 includes, for example, determining one or more decoy services for the containerized environment, wherein the one or more decoy services are determined using the characteristics of the genuine services already existing in the containerized environment. Step 1715 includes, for example, deploying the decoy service in a decoy container in the containerized environment. Step 1720 includes, for example, injecting breadcrumb data into the containerized environment, wherein the breadcrumb data is a reference to the decoy service, and wherein injecting the breadcrumb data modifies the containerized environment to include the breadcrumb data. Step 1725 includes, for example, monitoring messages to the decoy service, wherein the messages include one or more requests received at the decoy service from a requestor. Step 1730 includes, for example, transmitting, from the decoy service, one or more responses to the one or more requests, wherein after the one or more responses are received by the decoy service, the one or more responses are transmitted to the requestor by the decoy service. Step 17135 includes, for example, determining, using the messages, that the decoy service has been accessed and that the requestor is an intruder to the containerization system.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

What is claimed is:

1. A system for deception mechanism in a containerized environment, the system comprising:
   one or more data processors; and
   a non-transitory computer-readable storage medium containing instructions which when executed on the one or more data processors, cause the one or more processors to perform operations including:
      monitoring, by a monitoring service connected to a containerization system in a containerized environment, genuine services in the containerized environment to determine characteristics of the genuine services;
      determining one or more decoy services for the containerized environment, wherein the one or more decoy services are determined using the characteristics of the genuine services already existing in the containerized environment;
      deploying a decoy service from the one or more decoy services in a decoy container in the containerized environment;
      injecting breadcrumb data into the containerized environment, wherein the breadcrumb data is a reference to the decoy service, and wherein injecting the breadcrumb data modifies the containerized environment to include the breadcrumb data, wherein the breadcrumb data includes information for discovering and accessing the decoy service;
      monitoring messages to the decoy service, wherein the messages include one or more requests received at the decoy service from a requestor;
      transmitting, from the decoy service, one or more responses to the one or more requests, wherein after the one or more responses are received by the decoy service, the one or more responses are transmitted to the requestor by the decoy service; and
      determining, using the messages, that the decoy service has been accessed and that the requestor is an intruder to the containerization system.

2. The system of claim 1, wherein the decoy service forwards all requests from a requestor to a deception center located in the same or a different network.

3. The system of claim 2, wherein the deception center generates a response to the request from the requestor, and transmits the response to the decoy service, wherein when the decoy service receives the response from the deception center, the decoy service transmits the response to the requestor.

4. The system of claim 1, wherein when the decoy service is deployed in the decoy container in the containerized environment, the decoy service is registered with a service registry in the containerized environment.

5. The system of claim 1, wherein the one or more decoy services include a stack of multiple, related decoy services.

6. The system of claim 1, wherein the monitoring service is external to the containerization system.

7. A computer-implemented method for deception mechanism in a containerized environment, the method comprising:
   monitoring, by a monitoring service connected to a containerization system in a containerized environment, genuine services in the containerized environment to determine characteristics of the genuine services;
   determining one or more decoy services for the containerized environment, wherein the one or more decoy services are determined using the characteristics of the genuine services already existing in the containerized environment;
   deploying a decoy service from the one or more decoy services in a decoy container in the containerized environment;
   injecting breadcrumb data into the containerized environment, wherein the breadcrumb data is a reference to the decoy service, and wherein injecting the breadcrumb data modifies the containerized environment to include the breadcrumb data, wherein the breadcrumb data includes information for discovering and accessing the decoy service;
   monitoring messages to the decoy service, wherein the messages include one or more requests received at the decoy service from a requestor;
   transmitting, from the decoy service, one or more responses to the one or more requests, wherein after the one or more responses are received by the decoy service, the one or more responses are transmitted to the requestor by the decoy service; and
   determining, using the messages, that the decoy service has been accessed and that the requestor is an intruder to the containerization system.

8. The method of claim 7, wherein the decoy service forwards all requests from a requestor to a deception center located in the same or a different network.

9. The method of claim 8, wherein the deception center generates a response to the request from the requestor, and transmits the response to the decoy service, wherein when the decoy service receives the response from the deception center, the decoy service transmits the response to the requestor.

10. The method of claim 7, wherein when the decoy service is deployed in the decoy container in the containerized environment, the decoy service is registered with a service registry in the containerized environment.

11. The method of claim 7, wherein the one or more decoy services include a stack of multiple, related decoy services.

12. The method of claim 7, wherein the monitoring service is external to the containerization system.

13. A computer-program product tangibly embodied in a non-transitory machine-readable storage medium, including instructions configured to cause a data processing apparatus to perform operations for deception mechanism in a containerized environment, the operations including:

monitoring, by a monitoring service connected to a containerization system in a containerized environment, genuine services in the containerized environment to determine characteristics of the genuine services;

determining one or more decoy services for the containerized environment, wherein the one or more decoy services are determined using the characteristics of the genuine services already existing in the containerized environment;

deploying a decoy service from the one or more decoy services in a decoy container in the containerized environment;

injecting breadcrumb data into the containerized environment, wherein the breadcrumb data is a reference to the decoy service, and wherein injecting the breadcrumb data modifies the containerized environment to include the breadcrumb data, wherein the breadcrumb data includes information for discovering and accessing the decoy service;

monitoring messages to the decoy service, wherein the messages include one or more requests received at the decoy service from a requestor;

transmitting, from the decoy service, one or more responses to the one or more requests, wherein after the one or more responses are received by the decoy service, the one or more responses are transmitted to the requestor by the decoy service; and determining, using the messages, that the decoy service has been accessed and that the requestor is an intruder to the containerization system.

14. The computer-program product of claim 13, wherein the decoy service forwards all requests from a requestor to a deception center located in the same or a different network.

15. The computer-program product of claim 14, wherein the deception center generates a response to the request from the requestor, and transmits the response to the decoy service, wherein when the decoy service receives the response from the deception center, the decoy service transmits the response to the requestor.

16. The computer-program product of claim 13, wherein when the decoy service is deployed in the decoy container in the containerized environment, the decoy service is registered with a service registry in the containerized environment.

17. The computer-program product of claim 13, wherein the one or more decoy services include a stack of multiple, related decoy services.

18. The computer-program product of claim 13, wherein the monitoring service is external to the containerization system.

* * * * *